(12) United States Patent
Karlsson et al.

(10) Patent No.: US 9,243,096 B2
(45) Date of Patent: *Jan. 26, 2016

(54) POLYMERS SELECTIVE FOR NITRO-CONTAINING COMPOUNDS AND METHODS OF USING THE SAME

(71) Applicants: Ola John Ivar Karlsson, Lund (SE); Johan Fredrik Billing, Lund (SE); Ecevit Yilmaz, Bjärred (SE); Jan Robert Christian Svensson Stark, Växjö (SE)

(72) Inventors: Ola John Ivar Karlsson, Lund (SE); Johan Fredrik Billing, Lund (SE); Ecevit Yilmaz, Bjärred (SE); Jan Robert Christian Svensson Stark, Växjö (SE)

(73) Assignee: British American Tobacco (Investments) Limited, London (GB)

( * ) Notice: Subject to any disclaimer, the term of this patent is extended or adjusted under 35 U.S.C. 154(b) by 432 days.

This patent is subject to a terminal disclaimer.

(21) Appl. No.: 13/745,713

(22) Filed: Jan. 18, 2013

(65) Prior Publication Data

US 2013/0139834 A1 Jun. 6, 2013

Related U.S. Application Data

(63) Continuation-in-part of application No. 12/518,051, filed as application No. PCT/EP2007/062781 on Nov. 26, 2007, now Pat. No. 8,733,369.

(30) Foreign Application Priority Data

Dec. 7, 2006 (SE) ....................................... 0602625
Jan. 19, 2012 (GB) .................................. 1200878.5
Jun. 26, 2012 (GB) .................................. 1211348.6

(51) Int. Cl.
A24B 15/28 (2006.01)
C08F 222/20 (2006.01)

(Continued)

(52) U.S. Cl.
CPC ............. *C08F 222/20* (2013.01); *A24B 15/245* (2013.01); *C08F 220/20* (2013.01); *C08F 222/1006* (2013.01)

(58) Field of Classification Search
USPC .......... 131/297, 331, 332, 290, 298, 347, 360
See application file for complete search history.

(56) References Cited

U.S. PATENT DOCUMENTS 5,587,273 A 12/1996 Yan et al.
5,601,097 A 2/1997 Grandpré et al.
(Continued)

FOREIGN PATENT DOCUMENTS

CA 2565129 A1 12/2005
EP 1756023 B1 4/2012
(Continued)

OTHER PUBLICATIONS

Xia Yang, et al., "Analysis of the tobacco-specific nitrosamine 4-(Methylnitrosamino)-1-(3-pyridyl)-1-butanol in Urine by Extraction on a Molecularly Imprinted Polymer Column and Liquid Chromatography/Atmospheric Pressure Ionization Tandem Mass Spectrometry" Anal. Chem., Amer. Chem. Soc., vol. 77, No. 23, Dec. 1, 2005, pp. 7639-7645.*

(Continued)

*Primary Examiner* — Dennis Cordray
(74) *Attorney, Agent, or Firm* — NW Poulsen; La Pinol

(57) ABSTRACT

Porous beads are provided of a polymer of a non-acidic monomer and a cross-linker having polar functionality, one of which is hydrophilic, the other of which is hydrophobic, further comprising residues of polyvinyl alcohol. The beads may be molecularly imprinted or non-molecularly imprinted. The use of such beads in the removal of nitroso-containing compounds from material containing them is also disclosed. Also disclosed is a non-molecularly imprinted polymer which is selectively adsorbent for at least one tobacco specific nitrosamine in the presence of nicotine, said polymer being a polymerization product of a non-acidic monomer and a cross-linker having polar functionality, one of which is hydrophilic, the other of which is hydrophobic.

34 Claims, 12 Drawing Sheets

(51) Int. Cl.
  A24B 15/24 (2006.01)
  C08F 220/20 (2006.01)
  C08F 222/10 (2006.01)

(56) References Cited

U.S. PATENT DOCUMENTS

| | | | |
|---|---|---|---|
| 5,810,020 | A | 9/1998 | Northway et al. |
| 8,252,876 | B2 | 8/2012 | Yilmaz et al. |
| 8,733,369 | B2 | 5/2014 | Rees et al. |
| 8,807,142 | B2 | 8/2014 | Bhattacharyya et al. |
| 8,889,795 | B2 | 11/2014 | Rees et al. |
| 2002/0134394 | A1 | 9/2002 | Baskevitch et al. |
| 2003/0003587 | A1 | 1/2003 | Murray |
| 2006/0037620 | A1* | 2/2006 | Thompson ............ A24B 15/24 131/297 |
| 2007/0186940 | A1 | 8/2007 | Bhattacharyya et al. |
| 2008/0154007 | A1* | 6/2008 | Mori .................... B01J 20/26 526/328.5 |
| 2011/0054132 | A1 | 3/2011 | Yiannikouris et al. |
| 2013/0139835 | A1 | 6/2013 | Karlsson et al. |
| 2015/0038648 | A1 | 2/2015 | Rees et al. |

FOREIGN PATENT DOCUMENTS

| | | |
|---|---|---|
| GB | 1441543 | 7/1976 |
| WO | 9411403 | 5/1994 |
| WO | 9933768 | 7/1999 |
| WO | 0032648 | 6/2000 |
| WO | WO 01/65954 A1 | 3/2001 |
| WO | WO 2005/112670 A1 * | 12/2005 |
| WO | 2006067431 A1 | 6/2006 |
| WO | 2007067140 A1 | 6/2007 |
| WO | 2008068153 A2 | 6/2008 |
| WO | 2010085851 A1 | 8/2010 |
| WO | 2012158915 A2 | 11/2012 |

OTHER PUBLICATIONS

Notice of Acceptance from Australian Patent Office, dated May 9, 2011, for Australian Patent Application 2007329060, filed Nov. 26, 2007. [Previously submitted to USPTO in U.S. Appl. No. 12/518,051, filed Nov. 5, 2010].
Australian Office Action, dated Aug. 19, 2010, for Australian Patent Application 2007329060, filed Nov. 26, 2007. [Previously submitted to USPTO in U.S. Appl. No. 12/518,051, filed Nov. 5, 2010].
Decision to Grant a European Patent, dated Mar. 15, 2012, for EP05744145.3, filed May 24, 2005.
Dirion et al., "Selective Solid Phase Extraction . . . ," Chromatographia 2002, 56 Aug. (No. 3-4).
Sellergren "Highly Enantioselective and Substrate-Selective Polymers . . . ", J. Am. Chem. Soc. 1988, 110:5853-5860.
Liu et al., "Molecularly Imprinted Solid-Phase Extraction Sorbent . . . ," Analytical Letters, 2003, 36(8):1631-1645.
Zander et al., "Analysis of Nicotine and Its Oxidation Products . . . ," Anal. Chem. 1998, 70:3304-3314.
ISR mailed Aug. 29, 2005 for PCT/SE2005/000773, filed May 24, 2005.
Sellergren, B., et al., "The Use of Molecularly Imprinted Polymers . . . ," Chapter 23, Handbook of Sample Preparation (2011), pp. 443-471.
Cook, A., et al., "Bascicity of Some Mono- and Bicyclic Enamines . . . ," J. Org. Chem., 1995, 60, 3169-3171.
IPRP dated Sep. 4, 2006 for PCT/SE2005/000773, filed May 24, 2005.
Liqing Wu, et al., "Study on the recognition of templates and their analogues . . . ," J. Mol. Recognit., Nov.-Dec. 2004; 17(6):567-574.
Jun Matsui, et al., "A Molecularly Imprinted Nicotine-Selective Polymer," Analytical Letters, 1996, pp. 2071-2078.
WO mailed Jun. 19, 2006, for PCT/SE2005/000773, filed May 24, 2005.
Brannock et al., "Enamine Chemistry IV. Cycloaddition Reaction of Enamines . . . ," Apr. 1964.
Byrd et al., "Liquid chromatographic/tandem mass spectrometric method . . . ," 2003.
Kempe et al., "Review of Molecular Imprinting Used for Chrial Separations," 1995.
Mayes et al., "Molecularly imprinted polymers: useful materials for analytical chemistry?" 1997.
Sellergren, "Noncovalent molecular imprinting: antibody-like molecular recognition . . . ," 1997.
Wu et al., "Simultaneous Determination of Five Tobacco-Specific Nitorsamines . . . ," 2003.
Wulff, "Molecular Imprinting in Cross-Linked Materials," 1995.
Communication from the EPO Examining Division (with Annex), dated Sep. 21, 2009, for EP05744145.3, filed May 24, 2005.
Masque, N. et al. "Molecularly imprinted polymers: new tailor-made materials for selective solid-phase extraction," Trends in Analytical Chemistry, vol. 20, No. 9, 2001, pp. 477-486.
"SupelMIP Highly Selective SPE for Trace Analysis in Complex Matrixes," Sigma-Aldrich, 2006.
Simelis, O.; Whilborg, A.; Aurand C.; Trinh, A. Trace Level Analysis of NNAL in Urine Using SupelMIP SPE-NNAL.
International Search Report for PCT/GB2012/053247 dated Apr. 30, 2013.
International Preliminary Report on Patentability for PCT/GB2012/053247 dated Jul. 22, 2014.
Xia, Yang et al. "Analysis of the Tobacco-Specific Nitrosamine . . . "Analytical Chem., Amer. Chem. Soc., Columbus, US, vol. 77, No. 23, Dec. 1, 2005, pp. 7639-7645.
Liu, Y., et al., Molecularly Imprinted Solid-Phase Extraction Sorbent for Removal of Nicotine from Tobacco Smoke, Analytical Letters, vol. 36, No. 8, Jan. 1, 2003, pp. 1631-1645.
International Search Report and Written Opinion, mailed Jul. 25, 2008, for PCT International Application No. PCT/EP2007/062781, filed Nov. 26, 2007.
International Preliminary Report on Patentability, issued Jun. 10, 2009, for PCT International Application No. PCT/EP2007/062781, filed Nov. 26, 2007.
Naghash, Hamid J. et al. "Size Distribution of Polymers During the Photoinitiated Free-Radical Copolymerization of . . . " Polymer Bulletin 37, pp. 207-213 (1996).
Okay, Oguz et al. "Synthesis and Formation Mechanism of Porous 2-Hydroxyethyl Methacrylate-Ethylene . . . " Journal of Applied Polymer Science, vol. 46, 401-410 (1992).
Okay, O. "Macroporous Copolymer Networks" Prog. Polym. Sci. 25 (2000) pp. 711-779.
Vianna-Soares, Cristina D. et al. HPMA and HEMA Copolymer Bead Interactions with Eukaryotic Cells, Materials Research, vol. 7, No. 3, 473-477, 2004.

* cited by examiner

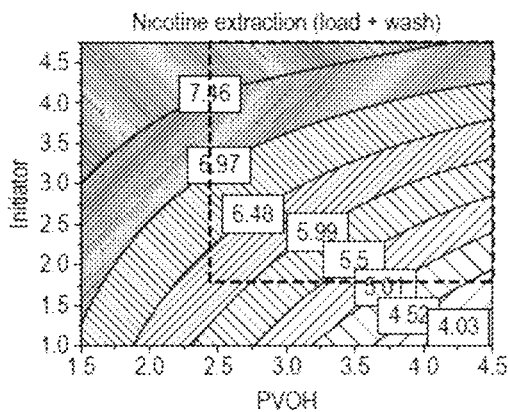 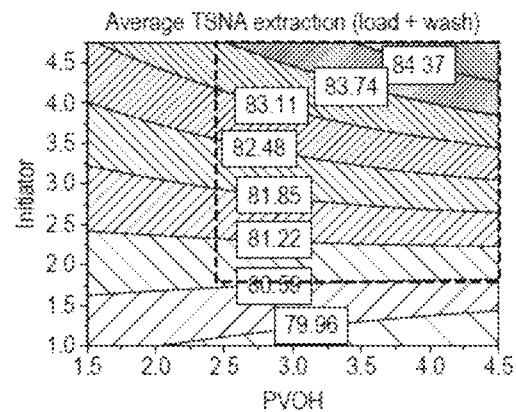
FIG. 9a          FIG. 9b
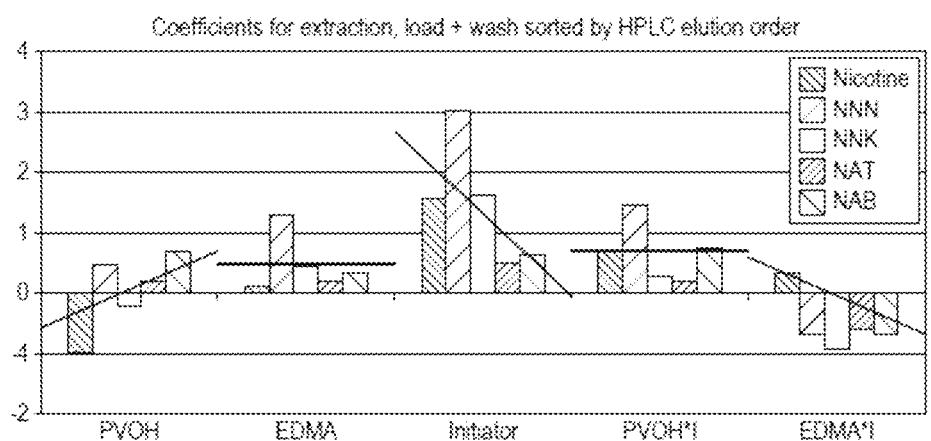
FIG. 10

POLYMERS SELECTIVE FOR NITRO-CONTAINING COMPOUNDS AND METHODS OF USING THE SAME

CROSS-REFERENCE TO RELATED APPLICATIONS

This application is a continuation in part of U.S. patent application Ser. No. 12/518,051 (Publication No. US 2011/0041859) having a 35 USC §371 (c)(1), (2) and (4) date of 5 Nov. 2010, which was a National Stage Entry of International Application No. PCT/EP2007/062781 filed 26 Nov. 2007, which claims priority under 35 U.S.C. §119 to Swedish application No. SE0602625.6 filed 7 Dec. 2006. It also claims priority under 35 U.S.C. §119 to Great Britain application No. GB1200878.5 filed 19 Jan. 2012 and Great Britain application No. GB1211348.6 filed 26 Jun. 2012. The entire disclosures of these earlier related applications are incorporated herein by reference.

FIELD OF THE INVENTION

This invention relates to porous beads of absorbent or adsorbent polymers, to methods for making the beads by suspension polymerization and to the use of the beads in the removal of nitroso-containing compounds from material containing such compounds, e.g. the selective removal of nitrosamine from material containing nitrosamine and nicotine. In some embodiments the invention relates to the use of the beads in bioanalysis and separation of nicotine metabolites. In other embodiments it relates to molecularly imprinted polymers and non-molecularly imprinted counterparts thereof having specificity for tobacco specific nitrosamines and includes methods of using the polymers to treat tobacco, tobacco substitutes, and their derivatives to reduce the level of targeted compounds therein.

BACKGROUND TO THE INVENTION

In the tobacco field, sorbent materials are used for the selective quantification of hazardous compounds in, or the removal of such compounds from, tobacco-based products, which compounds are either originally present in the raw tobacco leaf itself or generated when the product is processed (e.g. by curing) or consumed (e.g. by smoking or chewing). Nitroso-containing compounds such as nitrosamines, in particular the nitroso compounds known as tobacco-specific nitrosamines ("TSNAs") and their precursors, are examples of such compounds. TSNAs include:

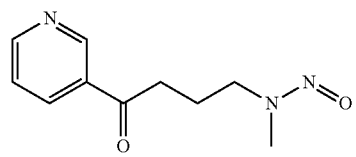

4-(methylnitrosamino)-1-(3-pyridyl)-1-butanone ("NNK"),

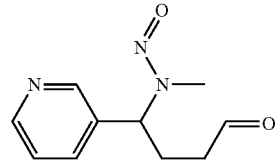

4-(methylnitrosamino)-4-(3-pyridyl)butanal ("NNA"),

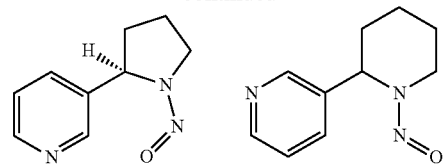

N-nitrosonornicotine ("NNN"), N-nitrosoanabasine ("NAB"),

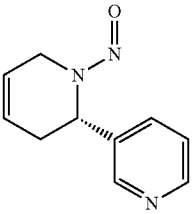

N-nitrosoanatabasine ("NAT"),

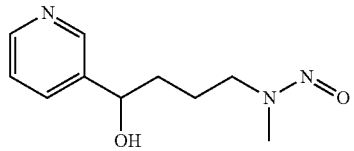

4-(methylnitrosamino)-1-(3-pyridyl)-1-butanol ("NNAL"),

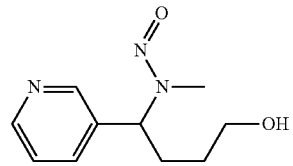

4-(methylnitrosamino)-4-(3-pyridyl)-1-butanol ("iso NNAL") and

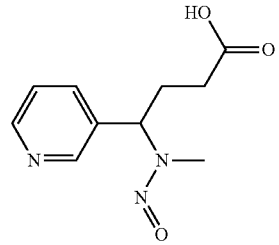

4-(methylnitrosamino)-4-(3-pyridyl)butanoic acid ("iso-NNAC").

Materials prepared by molecular imprinting (molecularly imprinted polymers or "MIPs") are polymers having sites adapted to bind selectively with targeted compounds.

There has been an attempt to remove nicotine from tobacco smoke using MIPS, as reported in Liu, Y., et al., Molecularly imprinted Solid-Phase Extraction Sorbent for Removal of Nicotine from Tobacco Smoke, Analytical Letters, Vol. 36, No. 8, pp. 1631-1645 (2003). The MIP described in the article was designed to bind nicotine and not nitrosamines. It is unclear if the MIP was in fact selective for nicotine as the scientific method producing the data was lacking in key control-checking elements.

WO 2005/112670, the disclosure of which is incorporated herein by reference, discloses MIPs that are selective for TSNAs relative to nicotine. That is to say, when exposed to a mixture of a TSNA and nicotine, the MIP adsorbs proportionately more TSNA than nicotine. The MIPs are prepared by polymerizing an acidic or highly acidic monomer, such as methacrylic acid ("MAA"), trifluoromethacrylic acid ("TF-MAA"), 4-vinylbenzoic acid or 4-vinyl benzene sulphonic acid, with a crosslinker such as ethylene glycol dimethacrylate ("EDMA"), trimethylolpropane trimethacrylate (TRIM)

or pentaerythritol tetraacrylate in the presence of a template molecule, such as 4-(methylpropenyl-amino)-1-pyridin-3-yl-butan-1-ol ("4 MPAPB") or pyridine carbinol. The resulting materials are described in the Examples as being in the form of powder prepared by crushing and grinding the solid polymer.

SUMMARY OF THE INVENTION

Molecularly Imprinted Polymers

In some embodiments the invention meets the needs in the art by providing unique MIPs which are particularly selective for nitroso-containing compounds.

MIPs of the invention can be obtained by co-polymerising a neutral functional monomer or monomers and a hydrophobic cross-linker in the presence of a structural analogue of a nitrosamine, in a polymerization medium containing a free radical initiator, after which the template is removed from the MIP.

The invention includes the use of the MIPs for analytical and preparative extractions, in chromatography, for analytical sample pre-treatment, in chemical sensors or as a solid phase filter for extraction of TSNAs from nicotine-containing substances or devices.

According to one embodiment, a molecularly imprinted polymer selective for at least one tobacco specific nitrosamine (TSNA) is provided, the polymer having been prepared using materials comprising a TSNA or a structural analogue thereof, a neutral functional monomer, and a hydrophobic cross-linker. The structural analogue of a TSNA could be an enamine analogue of a TSNA or a sulfonamide analogue of a TSNA or an amide analogue of a TSNA, e.g. a formamide analogue of a TSNA. The neutral functional monomer could be selected from the group consisting of 2-hydroxyethylmethacrylate (HEMA), acrylamide, methacrylamide, glycerol monoacrylate, and glycerol monomethacrylate. The hydrophobic cross-linker could be selected from the group consisting of ethylene glycol dimethacrylate (EDMA), trimethylolpropane trimethacrylate (TRIM), and divinylbenzene (DVB). In the embodiment of the invention, the polymer could be selective for NNK, NNA, NNN, NAB, NAT, NNAL, iso-NNAL, or iso-NNAC.

Non-Molecularly Imprinted Polymers

In further embodiments of the invention we have now identified certain non-molecularly imprinted polymers ("NIPs") that broadly comprise non-molecularly imprinted polymers of a non-acidic monomer (e.g. a monoalkenyl monomer) and a cross-linker (e.g. a di-, tri- or polyalkenyl monomer) having polar functionality, one of the monomer and crosslinker being hydrophilic, the other being hydrophobic.

In one aspect the invention provides a method for selectively removing a nitroso-containing compound from mixtures thereof with nicotine, said method comprising contacting the material with a selectively adsorbent non-molecularly imprinted polymer of a non-acidic monomer and a cross-linker having polar functionality, one of which is hydrophilic, the other of which is hydrophobic.

The NIPs may also be useful in the selective removal of nitroso-containing compounds from mixtures thereof with nicotine. In another aspect, the invention provides a method for selectively removing a nitroso-containing compound from material containing the compound and nicotine, said method comprising contacting the material with a selectively adsorbent non-molecularly imprinted polymer of a non-acidic monomer and a cross-linker having polar functionality, one of which is hydrophilic, the other of which is hydrophobic.

Nicotine of formula

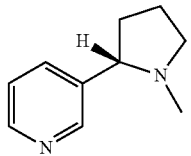

as can be seen, has heteroaromatic and heterocycloaliphatic nitrogen but does not have nitroso, carbonyl, hydroxyl or carboxylate groups in its molecule. It is believed, although the invention does not depend on this theory, that the use of a copolymer derived from monomers in which there is a difference in hydrophobicity gives a pattern of regions or domains that preferentially bind non-polar portions of the relevant small molecules and regions or domains where polar regions of the relevant small molecules can more readily bind and possibly form hydrogen bonds, these regions or domains giving rise to the observed difference in adsorption without the need for molecular imprinting.

Beads Comprising the Polymers

Embodiments of the invention include the above polymers, which may be molecularly imprinted or may not be molecularly imprinted, in the form of beads.

An embodiment of the invention provides porous beads of non-molecularly imprinted polymer of a non-acidic monomer and a cross-linker having polar functionality, one of which is hydrophilic, the other of which is hydrophobic, and further comprising residues of polyvinyl alcohol.

Another embodiment of the invention comprises molecularly imprinted porous beads of a polymer of a non-acidic monomer and a cross-linker having polar functionality, one of which is hydrophilic, the other of which is hydrophobic and further comprising residues of polyvinyl alcohol.

A further embodiment of the invention comprises a method of making beads of a polymer of a non-acidic monomer and a cross-linker having polar functionality, one of which is hydrophilic, the other of which is hydrophobic, and further comprising residues of polyvinyl alcohol, which method comprises suspension polymerizing (a) a monomer phase comprising porogen, initiator, the non-acidic monomer and the cross-linker having polar functionality, and (b) an aqueous phase comprising polyvinyl alcohol in an amount such that polyvinyl alcohol residues become present in the beads in an amount effective to promote selectivity.

It has been found that the conditions for suspension polymerization that are effective to give rise to polymer beads having selectivity for nitroso compounds, especially TSNA's over nicotine are more demanding than the conditions for simple bulk polymerization. It is believed (although the invention does not depend on this theory) that the combination of relatively high levels of water-insoluble initiator and relatively high levels of polyvinyl alcohol causes polyvinyl alcohol residues to become grafted into the resulting polymer. It is believed that these residues together with the burst of free radicals resulting from the relatively high amounts of initiator which promotes grafting are at least partly responsible for selectivity and may also influence the properties of the polymer e.g. in the direction of shorter chain lengths and greater cross-linking. Although polyvinyl alcohol is known as a dispersant in suspension polymerization of vinyl and divinyl monomers e.g. in the presence of toluene as non-aqueous solvent for the monomer mixture, its capacity to promote selectivity for nitroso compounds has hitherto been unreported. Okay et al., *J. App. Polymer Sci.*, 46, 401-410 discloses the preparation of copolymer beads of 2-hydroxyethyl methacrylate and ethylene glycol dimethacrylate. Polymerization is in 20% aqueous sodium chloride with bentonite in combination with gelatin as suspension stabilizer and with 1.5 wt % benzoyl peroxide as initiator. It is not believed that these beads exhibit the same selectivity as those described herein. Furthermore aqueous media not containing dissolved salts have been found to be effective in enabling beads having the above mentioned selectivity to be produced.

Embodiments of the invention include the above molecularly imprinted polymers in the form of beads. Such beads can be prepared, in embodiments of the invention, by a method comprising suspension polymerizing a non-acidic monomer and a cross-linker having polar functionality, one of which is hydrophilic, the other of which is hydrophobic in the presence of a structural analogue of a TSNA and polyvinyl alcohol to produce a molecularly imprinted polymer bound to the TSNA structural analogue and incorporating polyvinyl alcohol residues, and removing the structural analogue of the TSNA from the beads.

Applications for the Printed and Non-Imprinted Polymers and Beads Thereof.

The materials from which nitroso compounds are removed may contain the nitroso compounds alone or together with other compounds materials, including nicotine. In some embodiments the material comprises tobacco (which term includes tobacco leaf, tobacco stem, tobacco substitutes and blends of tobacco and tobacco substitutes). In other embodiment the material comprises a derivative of tobacco, including for example an extract of tobacco produced by contacting tobacco with a solvent. Other examples of derivatives of tobacco are the smoke or aerosol produced by combustion or thermal decomposition of tobacco. In these cases the material will usually contain nicotine together with nitroso compounds, specifically TSNAs.

In one embodiment, for example, tobacco may be treated with water or other extraction fluid to form an extract; the extract may be treated with a polymer as defined above; and material remaining in the extract may be recombined with the tobacco. The polymer may be washed after treatment of the extract, and nicotine is recovered from the washings, and nicotine in the washings is recombined with the treated fluid.

The invention further provides a cigarette or other product containing tobacco material reduced in nitrosmaines relative to nicotine, the reduction being effected by treating the tobacco material with water or other extraction fluid to form an extract; treating the extract with a selectively adsorbent non-molecularly imprinted polymer of a non-acidic monomer and a cross-linker having polar functionality, one of which is hydrophilic, the other of which is hydrophobic; and recombining material remaining in the extract with the tobacco material.

BRIEF DESCRIPTION OF THE DRAWINGS

In the following Examples, specific embodiments of the NIPs and their use will described, by way of example and illustration only, with reference to the accompanying drawings in which:

FIGS. 7a, 7b, 8a to 8d, 9 and 10 illustrate graphically some of the data described in Example 13.

In the drawings, similar features are given like reference numerals. Unless otherwise described, materials referred to in the Examples are commercially available or can be prepared by conventional techniques.

DETAILED DESCRIPTION OF PREFERRED EMBODIMENTS

Molecularly Imprinted Polymers

Figure 1:
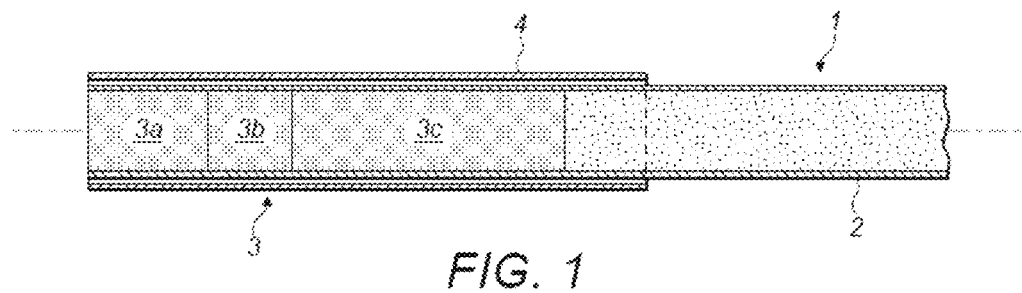
FIG. 1 is a side elevation, partly longitudinal cross-section and partially broken away view of a smoking article with a smoke filter according to the invention.

Molecular imprinting typically consists of the following steps: (1) a template compound, which may be the targeted molecule or a structural analogue thereof, is allowed to interact with a selected functional monomer, or monomers, in solution to form a template-monomer complex; (2) the template-monomer complex is copolymerized with a cross-linking monomer resulting in a polymeric matrix incorporating the template compound; (3) the template compound is extracted from the polymer matrix to form a MIP that can be used for selective binding of the targeted molecule. The reactive sites on the molecularly imprinted polymer exposed by removal of the template compound will be in a stereo-chemical configuration appropriate for reaction with fresh molecules of the targeted molecule. As a result, the molecularly imprinted polymer can be used for selective binding of the targeted molecule.

The 'non-covalent' route has been widely used to generate molecularly imprinted binding sites. This makes use of non-covalent self-assembly of the template compound and functional monomers to form the template-monomer complex, followed by free radical polymerization in the presence of a cross-linking monomer and finally template compound extraction. Covalent imprinting, in which the template molecule and a suitable monomer or monomers are covalently bound together prior to polymerization, can also be carried out according to known methods. The binding properties of the MIPS formed by either of the above methods can be examined by re-binding of the template molecule.

The polymerization is performed in the presence of a pore-forming solvent, a porogen. In order to stabilize the electrostatic interactions between the functional monomers and the template compound the porogen is often chosen from among aprotic solvents of low to moderate polarity. Template compounds often exhibit moderate to high solubility in the polymerization media and these, or their structural analogues, can therefore be utilized directly in this standard procedure. While it is possible to use the targeted molecule itself as the template, a structural analog of the target molecule is commonly preferred because: (a) the targeted molecule may be unstable under the polymerization conditions or may inhibit the polymerization; (b) the targeted molecule may not be available in sufficient quantities due to complexity of its synthesis or cost, or both; (c) the template may be insoluble or poorly soluble in the pre-polymerization mixture; (d) the MIP may remain contaminated by low levels of the targeted molecule retained in poorly accessible regions of the polymer matrix, which may bleed from the MIP during use; and/or (e) the target analyte(s) may present a significant health risk and should not be used as a template(s). In the case of nitroso-compounds, particularly the compounds known as TSNAs described below, it is often more convenient to use functional analogues thereof as template compounds. For example, sulfonamide, enamine, or amide, e.g. formamide, derivatives of TSNAs can be template compounds.

Where the MIP is derived using a functional analog of the targeted compound, the functional analog should be isosteric and preferably also isoelectronic with the targeted compound, or it may contain a substructure of the targeted compound where strong interactions may be likely.

As used herein a "structural analog" of a molecule is not identical to the original molecule, but is in part or whole similar to part or all of the original molecule in terms of molecular shape, electron distribution or other characteristics. Nitroso-containing compounds, particularly nitrosamines, which have the general formula

are among the numerous ingredients of tobacco and tobacco smoke that have been suggested as having a harmful effect on consumers. Of interest for the present invention is the group of nitrosamines that occur naturally in tobacco, TSNAs.

In the case of nitroso-compounds, particularly the compounds known as TSNAs it is often more convenient to use functional analogues thereof as template compounds. For example, sulfonamide, enamine, or amide, e.g. formamide, derivatives of TSNAs can be template compounds. Where the MIP is derived using a functional analog of the targeted compound, the functional analogue should be isosteric and preferably also isoelectronic with the targeted compound, or it may contain a substructure of the targeted compound where strong interactions may be likely. Possible isosteric analogs for the targeting of nitrosamines are seen below. The molecules shown are all derivatives of the parent amine and can be synthesized in a single step from the secondary amine and corresponding aldehyde or acid chloride.

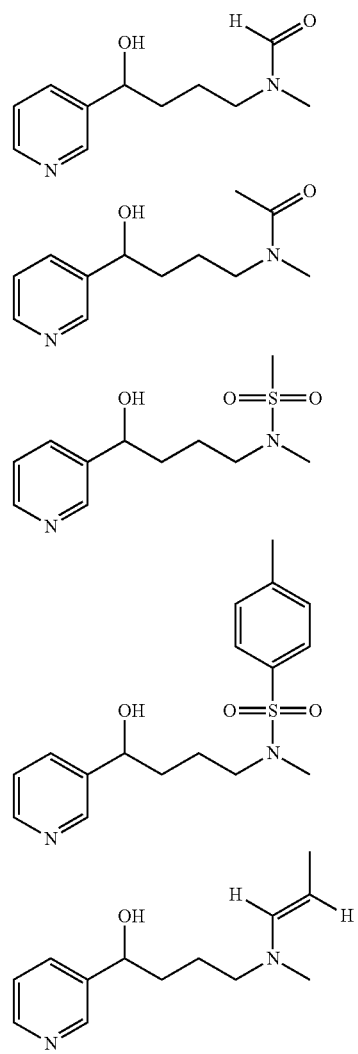

Non-Molecularly Imprinted Polymers

The term "non-acidic" includes neutral, alkaline and basic compounds. The monomer precursor of the polymer is non-acidic. It may be alkaline or basic but the use of basic hydrophilic polymers may create difficulties in manufacture, particularly in the formation polymer beads. The monomer precursors of the NIPs are therefore preferably neutral. A compound is normally considered neutral if exists with no net charge and is not capable of donating or accepting a proton, or otherwise has a pH of or in the region of 7 (e.g. 6.5-7.5).

The chemical structures of the NIPs are like that of all cross-linked polymers in that each of the NIPs is composed of a plurality of similar groups of atoms, or moieties, of relatively low molecular weight linked together in a molecular network to form larger molecules of much higher molecular weight. Each moiety corresponds in structure to a material, which is usually used in the production of the polymer but differs therefrom mainly in that an internal bond in the monomer has been rearranged to form bonds between the moieties in the polymer. The NIPs include moieties of at least two kinds, corresponding in structure to a non-acidic monomer and a crosslinker having polar functionality, one of which is hydrophilic, the other being hydrophobic.

Whilst the NIPs can be considered to be non-molecularly imprinted polymers of precursors comprising a monomer and a cross-linker that is polymerizable with the monomer, any description of the NIPs herein by reference to monomers which have structures that correspond to, or are similar or analogous to the moieties from which the NIPs are composed and which are capable of copolymerization should not be interpreted as implying that any particular method or process has been or must be used for the production or preparation of the NIPs.

The two moieties of the NIPs may correspond to a monomer and cross-linker that are capable of copolymerization by any mechanism, including free radical polymerization, such as occurs in the polymerization of unsaturated compounds, or condensation polymerization, such as occurs in the formation of polyesters or polyamides. The monomer will normally contain a single functional group that is capable of polymerization; the crosslinker will normally contain a plurality of functional groups capable of polymerization.

Where the monomer and the cross-linker are unsaturated, the monomer may be mono- or polyunsaturated, usually with unsaturation at a single carbon-carbon double bond. The crosslinker may be polyunsaturated (for example with two-fold or 3, 4, 5-fold or higher unsaturation) usually with unsaturation at two or more carbon-carbon double bonds The unsaturation in the monomer and the crosslinker may each be present separately in the form of an alkenyl or acrylic functional group. Examples of alkenyl functional groups are alkenyl groups having from 1-10 or 1-6 carbon atoms, in particular vinyl, vinylidene, allyl, and isopropenyl groups. Examples of acrylic functional groups are unalkylated and alkylated acryloyl groups such as acrylate, methacylate and ethacrylate groups. For example the monomer may be monoalkenyl and the crosslinker may be di-, tri-, or polyalkenyl.

The hydrophilic and hydrophobic characteristics of the NIPs may be provided by either of their precursors, i.e. either the crosslinker or the monomer. For example the NIPs may be polymers of a non-acidic hydrophilic monomer and a hydrophobic cross-linker. Alternatively the NIPs may be polymers of a non-acidic hydrophobic monomer and a hydrophilic cross-linker.

The hydrophobic and hydrophilic qualities of a compound, e.g. the NIP, the monomer or the cross-linker, reflect the polarity of the molecular structure of the compound, which in turn derives from unequal distribution of electrons between atoms or groups that are situated next to each other in the molecule. If one atom has a higher electronegativity than the other, it attracts a greater share of the electrons in the bond than its neighbour creating an electrical dipole. For example where a carbon atom is bonded to a halogen, oxygen or nitrogen atom, the carbon atom will have a lower share of the electrons, and therefore carry a partial positive charge, and the adjacent atom will carry a partial negative charge. The resulting dipoles within a molecule affect its interaction with other molecules. For example, due to the polar nature of the water molecule ($H_2O$), polar molecules are generally able to dissolve in water and are therefore usually more hydrophilic than non-polar molecules.

The monomer may be hydrophobic or hydrophilic, selected according to the hydrophilic or hydrophobic character of the crosslinker.

In some embodiments the moieties of the cross-linker in the polymer are in molar excess of the moieties of the acidic monomer. Thus the molar ratio of the moieties of the cross-linker and non-acidic monomer respectively may be from 3:1 to 10:1, in further embodiments from 4:1 to 6:1.

Monomers having polar functional groups (such as hydroxy, amide, imide, amino, halo, hydroxyalkyl or haloalkyl groups, e.g. $C_1$-$C_6$ hydroxyalkyl groups, ether or ester groups) may be particularly useful in combination with a hydrophobic crosslinker.

The monomer may, for example, comprise an acrylic compound, such as acrylamide, methacrylamide, N-methyl acrylamide. The monomer may also be selected from partly-esterified acrylic esters of polyhydric alcohols, such as 2-hydroxyethylmethacrylate (HEMA), glycerol monoacrylate and glycerol monomethacrylate, or from alkenyl compounds having polar functional groups, for example 2-(4-vinylphenyl)-1,3-propane diol. Mixtures of any of the foregoing may also be useful.

In combination with a hydrophilic cross-linker, a non-acidic hydrophobic monomer such as styrene may be useful. Hydrophobic monomers with polar functionality, such as 2-ethyl-hexyl acrylate ("EHA"), butyl methyl acrylate ("BMA"), vinyl pyridine, or methyl methacrylate may be useful.

Thus in one embodiment the non-acidic monomer may be selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, methacrylamide, N-methyl acrylamide, diethylamino ethylmethacrylate (DEAEM) and mixtures thereof, and the cross-linker may be hydrophobic. In that case the cross-linker may be selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof. In a further embodiment the monomer may be selected from styrene, methyl styrene, ethyl styrene, 2-vinyl pyridine, vinyl toluene, ethylhexyl acrylate (EHA), butyl methyl acrylate (BMA), methyl methacrylate and mixtures thereof and the cross-linker may be hydrophilic. In the latter case the cross-linker may be selected from N,N'-methylenebisacrylamide, di(ethylene glycol)dimethacrylate ("DEDMA"), pentaerythritol tetraacrylate, tri(ethylene glycol)dimethacrylate, tetra(ethylene glycol)dimethacrylate, poly(ethylene glycol) dimethacrylate and pentaerythritol triacrylate (PETRA) and mixtures thereof.

In some embodiments the polymer is a copolymer of 2-hydroxyethylmethacrylate (HEMA) and a hydrophobic crosslinker, e.g. copolymer of 2-hydroxyethylmethacrylate (HEMA) and ethylene glycol dimethacrylate (EDMA). It may also be a copolymer of 2- or 3-hydroxypropylmethacrylate (HEMA) and a hydrophobic crosslinker e.g. a copolymer of 2 or 3-hydroxypropylmethacrylate (HEMA) and ethylene glycol dimethacrylate (EDMA).

In one embodiment, the monomer is a non-acidic monomer other than HEMA.

In another embodiment, the monomer comprises a combination of HEMA and at least one other polymerizable monomer, such as any of the monomers listed above.

The crosslinker may be monomeric or polymeric. It may be hydrophobic or hydrophilic, selected according to the hydrophilic or hydrophobic character of the monomer. It preferably has at least some polar functionality. Crosslinkers containing at least one polar functional group per molecule (such as an hydroxyl, amide, amino, imide, ether, ester hydroxyalkyl or haloalkyl, e.g. $C_1$-$C_6$ hydroxylalkyl or haloalkyl group may be useful. For example, the crosslinker may be an acrylic compound, such as an acrylic ester, in particular a polyacrylic ester of a polyhydric alcohol such as EDMA or trimethylol propane trimethacrylate ("TRIM"), tetramethylene glycol dimethacrylate, di(ethylene glycol)dimethacrylate ("DEDMA") or pentaerythritol tetraacrylate. Acrylic amides such as N,N'-methylenebisacrylamide, N,N'-ethylenebisacrylamide, N,N'-butylenebisacrylamide, and N,N'-hexamethylenebisacrylamide may be useful. The aforementioned crosslinkers range from moderately hydrophobic, e.g. EDMA and TRIM, to hydrophilic, e.g. DEDMA, depending on the number and type of polar functional groups per molecule. Other hydrophilic crosslinkers of possible use include tri(ethylene glycol)dimethacrylate, tetra(ethylene glycol)dimethacrylate, poly(ethylene glycol)dimethacrylate and pentaerythritol trihacrylate (PETRA). Mixtures of the foregoing crosslinkers may also be used.

In one embodiment, the crosslinker is a compound other than EDMA.

In another embodiment, the crosslinker comprises a combination of EDMA and at least one other crosslinker, such as the crosslinkers listed above.

The non-molecularly imprinted copolymer of 2-hydroxyethylmethacrylate (HEMA), which is neutral, and ethylene glycol dimethacrylate (EDMA) is of particular interest. Other NIPs of interest include the following:

(i) non-molecularly imprinted polymers of HEMA and a crosslinker selected from TRIM, tetramethylene glycol dimethacrylate, pentaerythritol tetraacrylate, N,N'-methylenebisacrylamide, N,N'-ethylenebisacrylamide, N,N'-butylenebisacrylamide, N,N'-hexamethylenebisacrylamide and DEDMA, and (ii) non-molecularly imprinted polymers of a monomer selected from acrylamide, methacrylamide, N-methyl acrylamide, glycerol monoacrylate, glycerol monomethacrylate, 2-(4-vinylphenyl)-1,3-propane diol, methyl methacrylate ("MMA"), N-vinyl pyrrolidone ("NVP"), diethylamino ethyl methacrylate ("DEAEM"), styrene, ethyl hexyl acrylate ("EHA"), butyl methacrylate ("BMA") and vinyl pyridine, and a crosslinker selected from EDMA, TRIM, tetramethylene glycol dimethacrylate, pentaerythritol tetraacrylate, N,N'-methylenebisacrylamide, N,N'-ethylenebisacrylamide, N,N'-butylenebisacrylamide, N,N'-hexamethylenebisacrylamide, DEDMA tri(ethylene glycol)dimethacrylate, tetra(ethylene glycol) dimethacrylate, poly(ethylene glycol) dimethacrylate and pentaerythritol triacrylate (PETRA).

The NIPs may be in any solid suitable form suitable for the use for which they are intended, for example granules, powder, beads, monoliths, moulded articles, fibres, papers or cloths.

Beads

In one embodiment, the invention provides beads of a polymer of a non-acidic monomer and a cross-linker having polar functionality, one of which is hydrophilic, the other of which is hydrophobic.

The use of a polymerizable monomer and a cross linker in the manufacture of the polymer can often result in a polymer with a molecular structure in the form of a network of branched and interconnected molecular chains. Molecular networks of this kind provide a finished polymer of relatively low swelling capacity The swelling capacity of a polymer is a measure of the amount of liquid material that the polymer can absorb, usually expressed as a wt. %. A low swelling capacity (e.g. less than 100%) is desirable where the polymer is to be used in analytical or extraction purposes.

When intended for use in the selective separation of substances, the polymers are preferably in the form of porous solid material, for example porous granules or beads.

The porosity of the material may be such that it has a B.E.T. surface area in any range having an upper limit of for example 1200, 1000, 800, 600, 500 or 400 $m^2/g$, and a lower range of for example 100, 200, 300, 400 500 or 600 $m^2/g$. The surface area may, for example, fall into any of the following ranges, 200-1000, 300-800, 300-600, or 200-500 $m^2/g$. Embodiments have a B.E.T. surface area of 20-500 $m^2/g$, e.g. 50-500 $m^2/g$ and/or a pore volume of 0.2-1.5 ml/g e.g. 0.5-1.5 ml/g. Average pore diameters may be 30-300 Å e.g. 0-200 Å.

The monomer, cross-linker and polymerization conditions (e.g. solvent or porogen, initiator and temperature) may influence the physical and chemical properties of the NIPs. Thus, if the hydrophobic precursor makes up the bulk of the polymer, the polymer will usually also be hydrophobic. Without wishing to be limited by any theory, the use of a combination of precursors that are hydrophilic and hydrophobic may act to balance the hydrophilic properties of one precursor against the hydrophobic properties of the other and thereby influence the adsorption of nitiroso compounds by the polymer and the selectivity of the polymer towards nitroso compounds over nicotine. The selectivity of the NIPs may also be affected by the presence of polar functional groups in the monomer and cross linker. Typical polar functional groups include hydroxyl, ester, carboxyl, amide, imide and ether groups.

The presence of one or more polar functional groups in both the monomer and the cross linker may also be desirable provided that the polar group in the hydrophobic precursor does not suppress the hydrophobic property of the precursor.

The NIPs may be prepared by co-polymerising the functional monomer (or monomers) and the cross-linker (or cross linkers) under suitable reaction conditions, for example, by block polymerization, emulsion polymerization or suspension polymerization. The polymerization may be initiated thermally, photochemically (e.g. by UV light) or by any method appropriate for the materials and process used.

Where block polymerization is used, the resulting solid material is typically crushed and sieved to obtain a desired size fraction of particulate material. When prepared by either suspension or emulsion polymerization methods, crushing and sieving are unnecessary since the particle size can be controlled within the desired limits during the polymerization process.

Emulsion polymerization is usually carried but by dispersing the monomers in an aqueous solution containing a surfactant, a free-radical initiator and emulsifiers and stablisers. It usually results in polymer particles or beads with a volume average diameter less than 1 µm in size.

Suspension polymerization is conducive to the formation of polymer beads and may for example, be carried out using an aqueous suspension of a reaction mixture that contains the monomer and the cross linker. The suspension may be agitated to avoid agglomeration of suspended droplets of the reaction mixture while the polymerization reaction takes place. The resulting spheres or beads of the polymer are normally larger than those formed by emulsion polymerization, typically with a volume average diameter larger than 10 µm.

After polymerization of the precursors, the polymerised material will usually be separated from the reaction mixture, for example by filtration, and washed in order to separate the polymer from unreacted monomers and other materials present in the reaction mixture or produced in the reaction process, for example porogens. The washing may be carried out using water and organic solvents or mixtures thereof. The separated polymer may then be dried.

A number of variables in the conditions under which the polymerization reaction is carried out may also affect upon the physical and chemical properties of the resulting polymer. These variables include the amount and type of stabiliser, the amount of initiator used, the solids content of the reaction mixture, the presence of a porogen, the relative quantities of monomer and cross linker used, and the degree of agitation of the reaction mixture.

The reaction conditions can strongly affect the quality of the beads. We have found that in reaction systems involving the polymerization of hydrophilic and hydrophobic precursors, the presence of a stabiliser can favour the formation of well-defined, separate beads of polymer, and can reduce the formation of clusters or agglomerations of particles and the formation of fine particles.

In accordance with a further embodiment therefore, method of producing a polymer comprises polymerising precursors thereof comprising a non-acidic monomer and a cross linker having polar functionality, one of which is hydrophilic and the other is hydrophobic, the polymerization being carried out in the presence of a stabiliser.

Steric stabilisers are preferred, for example polyvinyl alcohols, block copolymers of polyethylene oxide and/or polypropylene oxide, and modified celluloses, such hydroxyethyl cellulose. Such stabilisers are characterized by long molecular chains that are capable of extending over and around the surface of droplets of the reaction mixture suspended in an aqueous medium containing the stabiliser and retarding the rate at which the droplets merge together and increase in size, which affects the physical form of the polymer produced in the reaction.

We have also found that the formation of the polymer in the presence of a stabiliser can affect the surface chemistry of the polymer. For example, the use of a polyvinyl alcohol stabiliser in the preparation of NIPs can positively influence the selectivity of the NIPs for TSNA's relative to nicotine.

The polymerization may be carried out using a suspension of a reaction mixture containing the monomer and cross linker in an aqueous medium containing the stabiliser.

Aqueous solutions of the stabiliser may be used containing, for example, at least 0.1%, 0.5% or 1%, by weight of the stabiliser, usually at least 1.75% or at least 2% by weight. High concentrations of stabiliser produce more viscous solutions, which create difficulties in processing. The stabiliser need not exceed 10% by weight of the aqueous solution, and lower concentrations are usually used, for example solutions containing no more than 6% by weight of the stabiliser. For example the stabilizer may be present in an amount of from 2.5 to 6% by weight e.g. 2.5-4.5 wt %.

Polyvinyl alcohols ("PVOH") are convenient for use as stabilisers. Polyvinyl alcohols are produced commercially by hydrolyzing polyvinyl acetate and are available in forms that give a range of viscosities in solution, the value of which varies according to the molecular weight of the polymer and its degree of hydrolysis (which reflects the percentage of polyvinyl acetate converted to polyvinyl alcohol. High molecular weight polyvinyl alcohols with 85-90% hydrolysis typically have molecular weights in the range 85,000-124,000 and viscosities in the range 23-27 cps as measured in a 4 wt. % aqueous solution at 20° C. Lower molecular weight polyvinyl alcohols typically have molecular weights in the range 13,000-23,000 and viscosities in the range 3.5-4.5 cps (measured under comparable conditions). Suitable polyvinyl alcohol compositions include partially (e.g. 80-90%) hydrolysed polyvinyl alcohols such as those offered by Celanese Corporation under the trade mark CELVOL 523.

In order to increase the surface area of the polymer particles, the polymerization may be performed in the presence of a pore-forming solvent, or porogen. The porogen is often chosen from among aprotic solvents of low to moderate polarity, for example toluene, chloroform, acetonitrile or mixtures thereof (e.g. 1:1 volume to volume mixture of acetonitrile and toluene). Toluene is a particularly effective porogen, especially when the reaction is carried out in the presence of polyvinyl alcohol.

Typically the porogen will be present in an amount of at least 0.5 ml/g of the monomer and cross linker. Higher amounts, e.g. up to 2 ml/g, may improve the selectivity of the NIP towards TSNA's, particularly the selectivity towards NNN, relative to nicotine. Usually the porogen will be present in an amount of about 1.5 ml/g of monomer and cross linker. The relative proportions of monomer and cross linker used in the polymerization will depend upon the particular substances used, their relative molecular weights and the degree of cross linking required in the polymer. In the preparation of the NIPs, a molar excess of cross linker may be used in relation to the monomer. Typically, the molar ratio of cross linker to monomer will be greater than 1:1, for example up to 10:1, 12:1 or 15:1. Usually the molar ratio of cross linker to monomer may be in the range of from 3:1 to 10:1. Higher ratios of cross linker to monomer may improve the selectivity of the NIP towards TSNA's, particularly the selectivity towards NNN, relative to nicotine. Typically the monomer and cross linker will be polymerised in amounts of from 4, 5 or 6 moles of cross-linker per mole of monomer. These weight ratios are particularly appropriate where the monomer is HEMA and the cross linker is EDMA.

If the polymerization processes is carried out in the liquid phase, the reaction mixture may be agitated, for example by stirring. In suspension polymerization, the vigour with which the reaction mixture is agitated can affect the particle size of the resulting polymer, more vigorous agitation producing smaller particles.

Where the polymer is produced in the form of beads, the bead size is typically in the range of from 10 to 1000 microns. The beads produced by the polymerization may be sieved or otherwise graded to produce a product with a particle size within a desired range.

The invention specifically includes non-molecularly imprinted polymer of a non-acidic monomer and a cross-linker that is at least partially polar, one of which is hydrophilic, the other of which is hydrophobic, wherein the polymer is in the form of beads.

The invention also specifically includes a method of making polymer beads which method comprises suspension polymerization of the monomer and the cross linker in an aqueous medium in the presence of a steric stabiliser and a porogen and separating the polymerised material from the reaction mixture.

The phase ratio of the reaction mixture of the monomer and cross linker, expressed as the weight % of solids in suspension, is typically no more than 25% by weight, often no more than 20% or 15% by weight. Usually the solids content will be at least 5% by weight, or at least 10% by weight. For example the solid content may lie in the range in the range 5-25% by weight, or about 10, 15 or 20% by weight.

The polymerization may be carried out in the presence of an initiator. For example, peroxide free-radical initiators, such as lauroyl peroxide or benzoyl peroxide, may be used, or azo free-radical initiators, such as 2,2'-azobis(2-methylproprionitrile) ("AIBN"), 2,2'-azobis(2-methylbutyronitrile) ("AMBN") may be used. Typically an initiator will be present in an amount of at least 0.1% by weight of the monomer and cross linker and usually at least 0.5% or 1% by weight, or more, for example at least 2% or 3% by weight. The initiator may be present in an amount of up to 5%, 6% or 10% by weight of the monomer and cross linker, for example in the range 0.5 to 6 wt. %. The amount of initiator may have a small but significant effect upon the particle size of the polymer when produced by suspension polymerization, higher levels of initiator producing larger particles.

The methods of preparation of polymers disclosed herein are applicable to the production of both NIPs and MIPs. In the preparation of NIPs, no template molecule is present. The resulting polymer is therefore not molecularly imprinted. In the preparation of MIPs a molecularly imprinting template material is present in the polymerization reaction. Examples of template molecules suitable for the preparation of MIPs selective for nitroso compounds are described in WO 2005/112670 and WO 2008/068153.

An embodiment of the invention therefore provides molecularly imprinted porous beads of a selectively adsorbent polymer of a non-acidic monomer and a cross-linker having polar functionality, one of which is hydrophilic, the other of which is hydrophobic and further comprising residues of polyvinyl alcohol.

Another embodiment of the invention provides a method of making molecularly imprinted polymer beads which comprises suspension polymerizing a non-acidic monomer and a cross-linker having polar functionality, one of which is hydrophilic, the other of which is hydrophobic in the presence of a structural analogue of a TSNA and polyvinyl alcohol to produce a molecularly imprinted polymer bound to the TSNA structural analogue and incorporating polyvinyl alcohol residues, and removing the structural analogue of the TSNA from the beads.

Selectivity

The preferred NIPs exhibit selectivity, relative to nicotine, for at least one nitroso compound and in particular selectivity for at least one TSNA.

The selectivity of an adsorbent material for a first substance relative to a second substance may be calculated as the relative weight percentages of the first substance to the second extracted by the adsorbent material from a solution containing both substances. For example, if an adsorbent material is contacted with a solution containing a mixture of a nitrosamine and nicotine, the selectivity of the adsorbent material is calculated by the following formula:

$$\text{Selectivity for nitrosamine relative to nicotine} = \frac{\text{wt \% nitrosamine extracted}}{\text{wt \% nicotine extracted}}$$

The preferred NIPs may find use in the selective adsorption of nitroso-compounds such as nitrosamines, and in particular the TSNAs, including NNK, NNA, NNN, NAB, NAT, NNAL, iso-NNAL or iso-NNA. The NIPs may also find use in the analysis and quantification of nitroso compounds in vivo, in particular the quantification of compounds present in human biological fluids, for example in relation to consumption of tobacco products, and in the preparation and evaluation of non-tobacco products.

Kits

One embodiment comprises the use of the NIPs for analysis, detection, quantification, separation, preparative extraction, chromatography, analytical sample pre-treatment, chemical sensors or solid phase filter extraction, and in particular such uses of NIPs that are selective for nitroso compounds such as TSNAs.

A further embodiment comprises a kit comprising a non-molecularly imprinted polymer of a non-acidic monomer and cross-linker having polar functionality, one of which is hydrophilic, the other of which is hydrophobic, the polymer being selective relative to nicotine for at least one nitroso compound, wherein the polymer is packed in a column suitable for solid phase extraction or chromatography.

A further embodiment comprises a kit including any of the aforementioned NIPs that is selective relative to nicotine for at least one nitroso compound, and instructions for using the NIP to perform at least one of analysing, detecting, quantifying, separating, extracting, reducing or removing nitrosamines in or from a sample.

Such a kit may for example include one or more of the following items: a column for solid phase extraction ("SPE"), chromatography or other filtration techniques, a quantity of any of the foregoing NIPs, possibly divided into discrete quantities suitable for loading into the filtration column, an SPE, chromatography or other filtration column packed with a quantity of any of the foregoing NIPs, reagents for conditioning the column, reagents for eluting the column and re-generating the NIP, and one or more tools for handling the ingredients, such as a spatula, measuring cylinder and beaker.

The equipment may be used for example in the analysis of materials containing nitroso compounds, such as biological samples which may contain such compounds together with other compounds, including nicotine or its metabolites.

Applications

The NIPs may also find application in connection with consumer products based on nicotine, in particular smoking cessation aids containing nicotine, such as chewing gum, lozenges, dermal patches and sprays. The consumption of such nicotine containing products can cause nitrosamine nicotine metabolites to be produced in vivo by natural metabolic processes during the residence of the nicotine within body tissues. Where the NIP is selective for nitroso compounds, it may for example be used to monitor the low levels of nitroso-containing nicotine metabolites in vivo and also to monitor levels of nicotine and oxidation products thereof during production.

The NIPs may also find use in the recognition of molecules and in solid phase extractions (SPE) used, for example, in bioanalysis, food analysis and environmental analysis and generally in the selective removal of components from products.

The NIPs may also find use in materials for and methods of analysing, detecting, quantifying, separating, extracting, reducing or removing components from tobacco or tobacco smoke, in particular TSNAs.

The NIPs may also find application in reducing the harmful effects of consuming material containing tobacco, tobacco substitutes or mixtures thereof by reducing the levels of targeted compounds such as nitroso-compounds and particularly TSNAs.

In another embodiment therefore, a method of delivering nicotine to a subject comprises producing tobacco leaf, treating the leaf with a non-molecularly imprinted polymer of a non-acidic monomer and a cross-linker having polar functionality, one of which is hydrophilic, the other of which is hydrophobic that is selective relative to nicotine for TSNAs in order to reduce the TSNA content of the leaf, producing a consumable tobacco product therefrom and supplying the tobacco product to a consumer so as to deliver the nicotine.

In another embodiment, a method of reducing the level of at least one nitroso-compound, in particular at least one TSNA, in a tobacco product comprises treating the tobacco product with any of the aforementioned NIPs that is selective relative to nicotine for nitroso compound so as to effect reduction of the nitroso-compound in the tobacco product.

The tobacco product treated may be a material containing tobacco (including tobacco leaf or tobacco stem), a tobacco substitute, or a blend of tobacco and tobacco substitutes, or a derivative of tobacco, including for example tobacco extract produced by contacting the material with a solvent, or smoke or aerosol produced by combustion or thermal decomposition of tobacco.

Where the tobacco product is produced by the thermal decomposition of material containing tobacco or a tobacco substitute, the decomposition may be effected by combustion of the material, as, for example, in a conventional cigarette, or by heating the material to a temperature below its combustion temperature, in accordance with a process used in some known alternative tobacco products in order to produce an aerosol that is inhaled by the consumer. In one method, the thermal decomposition products of the material are contacted with a filter that adsorbs undesired components therefrom.

In another embodiment, the tobacco product is produced by contacting material containing tobacco or a tobacco substitute, or a mixture thereof, with a solvent.

In another embodiment, a method of treating tobacco is provided, in which a tobacco material is treated with an extraction fluid to form an extract, the extract is treated with any of the aforementioned NIPs selective for nitroso compounds, the treatment being effective to reduce the level of nitroso compound in the extract, and material remaining in the extract is recombined with the tobacco material.

In this method, the material may be in any convenient form, for example fines, stems, scraps, cut lamina, shredded stems, or any combination thereof. The method is equally applicable to both tobacco itself and to tobacco substitutes, i.e., natural or synthetic materials having similar characteristics to natural tobacco that enable them to be consumed in a similar way to tobacco, whether by smoking, chewing, inhaling or otherwise.

The extraction fluid may be an aqueous or non-aqueous solvent, such as water, optionally containing a surfactant, methanol or ethanol or a super-critical fluid extraction medium, such as super-critical carbon dioxide liquid. The extraction may be carried out under any conditions favoring the extraction of nitrogen-containing compounds from tobacco.

Where NIPs are used to extract TSNA's from tobacco, for example by treating the tobacco material with an extraction fluid and treating the fluid with a NIP to remove TSNA's, it may be beneficial to wash the NIPs after contact with the extraction fluid to recover adsorbed nicotine, which may be less strongly bound to the NIP than the TSNA. The nicotine in the washings may thus be recombined with the fluid after treatment with the NIP.

According to a further embodiment there is provided a smoking material the nitroso compound content of which, preferably the TSNA content, has been reduced by treatment with any of the aforementioned NIPs selective for such nitroso compound.

Smoking Materials and Products

According to another embodiment, a smoking article comprises any of the aforementioned NIPs, and preferably any of the aforementioned NIPs that are selective for at least one nitroso compound, in particular at least one TSNA.

The smoking article may take any conventional form, for example a cigarette, cigar or cigarillo. In particular the smoking article may comprise a rod of smoking material optionally in a wrapper, with or without a filter. The wrapper may be of paper, tobacco leaf, reconstituted tobacco or a tobacco substitute. Alternatively, where, for example, the smoking article is intended to produce low emissions of side-stream smoke, or lower levels of pyrolysis products in the mainstream smoke, the wrapper may be composed of non-combustible inorganic material such as a ceramic material. The filter may be of any suitable material, for example fibrous cellulose acetate, polypropylene or polyethylene, or paper.

The smoking material is preferably tobacco but may be a tobacco substitute such as non-tobacco smoking material. Examples of non-tobacco smoking materials are dried and cured vegetable material, including fruit materials, and a synthetic smoking material such as may be produced from alginates and an aerosol-generating substance such as glycerol. The smoking material may also comprise a blend of tobacco and non-tobacco smoking materials. Where the smoking material comprises tobacco, the tobacco may be of any suitable type, or a blend thereof, including air-cured, fire-cured, flue-cured, or sun-cured lamina or stem, and may have been processed using any appropriate process. For example, the tobacco may be cut, shredded, expanded or reconstituted. The smoking material may also include conventional additives, such as ameliorants, colorants, humectants (such as glycerol and propylene glycol), inert fillers (such as chalk), and flavourings (such as menthol, sugar, licorice and cocoa) as permitted by regulation.

The NIPs may be incorporated in the smokable material and accordingly a further embodiment comprises smoking material incorporating any of the aforementioned NIPs.

Where the smoking article comprises a rod of smokable material in a wrapper, the NIP may be incorporated in the wrapper. The wrapper may be a cellulose-based material such as a paper or a tobacco based material such as reconstituted tobacco.

According to a further embodiment, a tobacco product comprises tobacco and any of the aforementioned NIPs, preferably any of the NIPs that are selective relative to nicotine for at least one TSNA.

The tobacco product may be a cigarette which comprises a rod of tobacco, a wrapper, and a filter.

According to a further embodiment, a smoke filter is provided that incorporates any of the aforementioned NIPs. Typically the NIP will be arranged in the filter so that, in use, the NIP is exposed to smoke or aerosol passing through the filter. For this purpose the NIPs may be incorporated in the filter in granular form. In some case the NIPs may be produced in the form of fibres and incorporated in the filter as filter tow. Alternatively the NIPs may be incorporated in filter paper, tipping paper or cigarette paper. The smoke filter may be produced separately from the smoking article, for example in the form of a cigarette or cigar holder, or it may be integrated into the smoking article, for example in the form of a cigarette with a filter tip.

Smoke filters in the form of filter tips may be of any conventional construction. For example a "dalmatian" type filter comprising a section of fibrous filter material, such as cellulose acetate, the NIP being in particulate form and distributed throughout the section. Alternatively the filter may be in the form of a "cavity" type filter, comprising multiple sections wherein the NIP may lie between two adjacent sections of fibrous filter material. The smoke filter may also comprise other adsorbent materials such as an ion-exchange resin, a zeolite, silica, alumina or amberlite.

In use, the smoke passes through the filter, the NIP selectively adsorbs and retains the targeted compounds from the smoke and the filtered smoke is delivered to the smoker.

The smoke filters and smoking articles may include means for protecting the NIP from, or reducing its exposure to, smoke when in use. This may be achieved in a number of different ways. For example the smoke filter may comprise a filter element for adsorbing materials from the vapour or particulate of smoke. Such filter elements may comprise a general adsorbent such as activated carbon, which may be in any convenient form, such as threads, particles, granules, cloth, or paper. The filter element may also be a selective adsorbent such as an ion-exchange resin, a zeolite, silica, alumina or amberlite. The means for protecting the NIP may include two or more such filter elements of different compositions, for example a first filter element of cellulose acetate, and a second filter element of activated carbon. The provision of multiple filter elements in smoke filters and smoking articles is well known, and any conventional configuration of filter, and associated methods of construction, may be used.

Although selectivity, kits, applications and smoking products have been discussed above in terms of NIPs, it will be appreciated that the above discussions are equally applicable to beads, whether MIP beads or NIP beads.

How the invention may be put into effect will now be further described in the following examples.

Example 1

Preparation of NIPs for Evaluation

Three samples of each of four different NIPs are prepared using two monoalkenyl monomers methacrylic acid (MAA), which is acidic, and 2-hydroxyethylmethacrylate (HEMA), which is neutral, and two cross-linkers (in this instance di- or trialkenyl monomers) namely pentaerythritol triacrylate (PETRA), which is hydrophilic, and ethylene glycol dimethacrylate (EDMA) which is hydrophobic. No template material was present in the polymerization that would molecularly imprint the polymer.

For each combination, a pre-polymerization solution is prepared by dissolving the monoalkenyl monomer, the cross-linker and a free-radical initiator such as 2,2'-azo bis(2-methyl propionitrile) (AIBN) in chloroform or other aprotic solvent. The solution is transferred to a polymerization vessel and sealed. Polymerization is initiated at 70° C., and maintained at this temperature for 24 hours. The resulting NIP is coarsely crushed, extracted first with methanol: acetic acid 4:1 and then with methanol to remove any unreacted monomers, and dried.

Example 2

Use of NIPs in the Selective Adsorption of a Nitrosamine

The performances of the NIPs of Example 1 in the selective adsorption of a nitrosamine relative to nicotine can be evaluated by treating a 1:1 test mixture of N-nitrosopiperidine and nicotine in water with the different NIPs. Results are summarized in Table 1, which gives averages for the three absorption experiments for the three samples of each NIP.

TABLE 1

| Monomer | Cross-linker | % nitrosamine adsorbed | % nicotine adsorbed |
|---|---|---|---|
| MAA (acidic) | PETRA (hydrophilic) | 39 | 48 |
| HEMA (neutral) | PETRA (hydrophilic) | 41 | 9 |
| MAA (acidic) | EDMA (hydrophobic) | 84 | 28 |
| HEMA (neutral) | EDMA (hydrophobic) | 84 | 6 |

As is apparent from Table 1, the non-molecularly imprinted polymers prepared from the hydrophobic cross-linker bind significantly more of the nitrosamine than the NIPs prepared from the hydrophilic cross-linker, and the NIPs prepared from the neutral monomer and the hydrophobic cross-linker are more selective for the nitrosamine, relative to the nicotine, than the NIPs prepared from the acidic monomer and the hydrophobic cross-linker.

Example 3

Further Comparison of NIPs

In view of the surprisingly positive performance of non-acidic, hydrophobic NIPs as summarized in Table 1, the NIP prepared from the neutral monomer HEMA and the hydrophobic cross-linker EDMA (NIP 1) was compared with a non-molecularly imprinted polymer prepared from the neutral monoalkenyl monomer HEMA and the hydrophilic trialkenyl monomer pentaerythritol triacrylate (PETRA) (NIP2).

Two SPE columns were prepared, one containing 25 mg of NIP1 ground and sieved to 20-90 µm, the other 25 mg of NIP2 ground and sieved to 20-90 µm. To each column, 1 ml of aqueous solution containing approximately 80 ng/ml each of NNN, NNK, NAT, 40 ng/ml NAB and 0.2 g/ml nicotine was added. HPLC was used to determine the amount of TSNA that had not been extracted in each column, allowing for calculation of the extracted material.

1 ml of water was then passed through each column and the amount of TSNA released, if any, was determined. Table 2 summarizes the results, which are the average of two experiments.

TABLE 2

| Sample | Nicotine | NNN | NNK | NAT | NAB |
|---|---|---|---|---|---|
| | % extracted | | | | |
| NIP1 (HEMA/EDMA) | 23 | 99 | 100 | 99 | 100 |
| NIP2 (HEMA/PETRA) | 22 | 97 | 100 | 100 | 100 |
| | % released on water wash | | | | |
| NIP1 (HEMA/EDMA) | 7 | 9 | 0 | 0 | 0 |
| NIP2 (HEMA/PETRA) | 10 | 14 | 0.5 | 0 | 0 |

The data in Table 2 indicates a low level of release of the TSNAs from the NIPs upon washing with water and this is surprising in view of the absence of molecular imprinting. What is more, the retention of TSNAs by the NIPs appears to be stronger than their retention of nicotine.

Regeneration of the NIPs can be performed by washing the NIP with a mixture of acidic and alcoholic solvents, such as a 0.5% solution v/v of trifluoroacetic acid (TFA) in methyl alcohol.

Example 4

Evaluation of NIPs with Specific TSNAs and Nicotine

The efficacy of NIPs as selective adsorbents of TSNAs is demonstrated in the following experiment. An SPE column is prepared with 25 mg of ground and sieved NIP and 5 ml of a test solution are loaded on the column in five successive loads of 1 ml. The test solution contains approximately 80 ng/ml each of NNN, NNK, NAT, 40 ng/ml NAB and 4 g/ml nicotine in pH 6.3 phosphate buffer (ionic strength 0.09). After loading each sample, the unretained amounts of nicotine and each TSNA (i.e. the percentage of each constituent in each load that passes through the column) are determined using HPLC. Results are shown in Table 3 in which the amount of each constituent not retained on the column in each 1 ml load is expressed as a percentage of the total amount of each constituent.

TABLE 3

| | % sample not retained on column | | | | |
|---|---|---|---|---|---|
| Load No | 1 | 2 | 3 | 4 | 5 |
| Nicotine | 82 | 99 | 100 | 100 | 100 |
| NNN | 0 | 33 | 71 | 88 | 97 |
| NNK | 0 | 3 | 21 | 28 | 36 |
| NAB | 0 | 5 | 12 | 21 | 22 |
| NAT | 0 | 1 | 9 | 15 | 16 |

As seen from the Table, decreasing amounts of the nicotine are bound by the NIP in successive loading steps. The first steps saturate the NIP with nicotine. Progressively less nicotine is retained in successive loads.

Amongst the TSNAs, NNN is most weakly bound to the NIP, though significantly more strongly than nicotine. Although no NNN passes through the column in the first loading step, progressively more of the sample is passed through the column after the second loading step. The NIP performs better in retaining NNK, NAB, and NAT. Thus, the combination of neutral functional monomer and hydrophobic di- or polyolefinic monomer results in a surprisingly high retention of TSNA from a mixed sample while retaining only a minimal amount of nicotine.

Example 5

Use of a NIP in the Treatment of Tobacco Extracts

NIPs produced as described above can be incorporated into a SPE column and the column can be conditioned in a manner that will be known to those skilled in the art. Cut or shredded tobacco leaf is extracted with water for 15-25 minutes at 60° C. The tobacco is separated from the solution by filtration and dried. The solution is passed through the SPE column and TSNA is absorbed from the extract. Optionally water is passed through the column and combined with the treated extract. The column is then drained and the solution concentrated by film evaporation, the concentrate is then recombined with the extracted tobacco and dried in air. Performance of the NIP can be evaluated by eluting bound compounds from the NIP using 2×1 ml methanol containing 0.5% TFA and extract analyzed using HPLC-UV.

Example 6

Use of NIPs in the Treatment of Tobacco Extracts

Using a continuous extraction process, US Blend-type shredded tobacco leaf is loaded into a first extraction chamber into which super-critical carbon dioxide is fed. After contacting the tobacco, the carbon dioxide is fed into a second extraction chamber containing a NIP. Having contacted the polymer, the carbon dioxide is returned to the first extraction chamber and contacted again with the tobacco. The cyclic process is continued until the TSNA content of the tobacco has been reduced to a desired level, whereupon the carbon dioxide is vented from the system, and the tobacco removed from the first chamber. The NIP in the second chamber is then regenerated for reuse.

Example 7

Use of NIPs for Sample Analysis

A SPE column is prepared by adding 25 mg of NIP. A test sample is added to the column, for example 5 ml of human urine potentially containing TSNAs. The sample is allowed to pass through the column, which would then be subjected to vacuum to remove all liquid and ensure the NIP material is dry. A wash may be conducted to remove any interfering compounds that may have non-specifically associated with the NIP, for example 1 ml distilled water. After drying the TSNAs can be recovered from the NIP using, e.g., 1 ml DCM and quantified using HPLC.

Example 8

Use of NIPs in Smoking Articles

Figure 2:
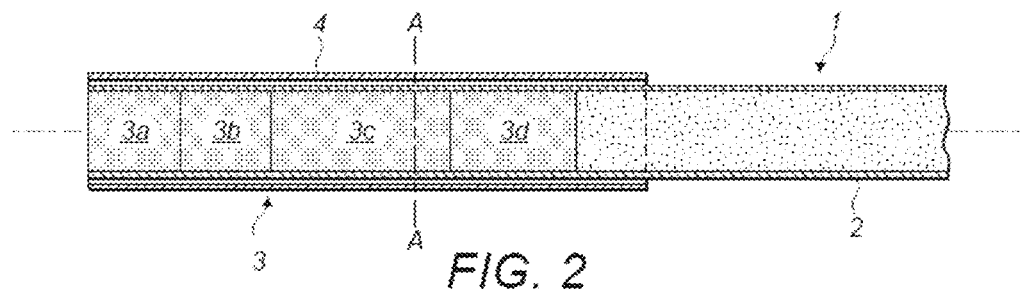
FIG. 2 is a similar view to FIG. 1 of a smoking article with an alternative smoke filter according to the invention.

Referring to the drawings, FIGS. 1 and 2 illustrate smoking articles in the form of cigarettes having a rod 1 of tobacco encased in a wrapper 2 attached to a smoke filter 3 by means of a tipping paper 4. For clarity, the tipping paper 4 is shown spaced from the wrapper 2, but in practice they lie in close contact.

In FIG. 1, the smoke filter 3 comprises three cylindrical filter elements 3a, 3b, 3c. The first filter element 3a at the mouth end of the filter is 7 mm in length, composed of cellulose acetate tow impregnated with 7% by weight of triacetin plasticizer having a 25 mm water gauge pressure drop over its length. The second filter element 3b, positioned centrally is a cavity 5 mm in length containing 150 mg of activated carbon granules. The third filter element 3c adjacent the rod 1 is 15 mm in length, has a 90 mm water gauge pressure drop over its length, and comprises 80 mg cellulose acetate tow. The tow is impregnated with 4% by weight of triacetin and has 80 mg of NIP specific for TSNAs as described herein, distributed evenly throughout its volume in a "Dalmatian" style.

The cigarette shown in FIG. 2 is similar to that of FIG. 1 except that the smoke filter 3 has four coaxial, cylindrical filter elements 3a, 3b, 3c and 3d. The first filter element 3a at the mouth end of the cigarette is 5 mm in length, and composed of cellulose acetate tow impregnated with 7% by weight of triacetin plasticizer. The second filter element 3b, positioned adjacent the first filter element 3a is a cavity 5 mm in length containing 200 mg of NIP, produced as described herein. The third filter element 3c adjacent the second filter element 3b is 10 mm in length and comprises cellulose acetate tow impregnated with 7% by weight of triacetin. The fourth filter element 3d lies between the third filter element 3c and the rod, is 7 mm in length and the rod comprises 80 mg of granular activated carbon. A ring of ventilation holes 5 is formed in the tipping paper 4 in a radial plane A-A which deliver air into the third filter element 3c about 3 mm downstream of the junction with the fourth filter element 3d when smoke is inhaled through the cigarette.

Example 9

Use of NIPs in Test Kits

Figure 3:
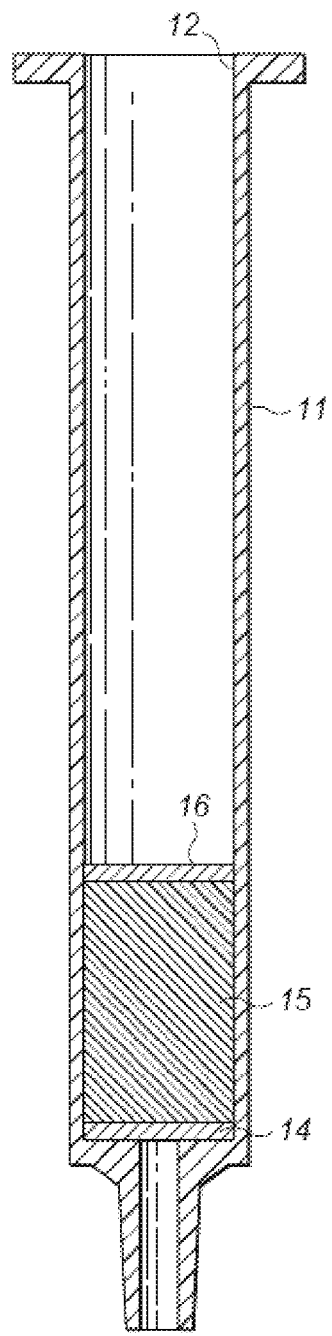
FIG. 3 is a longitudinal cross section of a column used for chromatographic or solid phase separation as incorporated in a kit.

Referring to FIG. 3, a typical column suitable for chromatography or SPE is illustrated. The column comprises a tube 11, which may be cylindrical and made for example of metal, glass or plastic, with a first end having an inlet port 12 and a second end having an outlet port 13 respectively, which ports are used to connect the column to other chromatography equipment. The first and second ends may independently be provided as separate pieces attached or attachable to the column by a threaded connection, interference fit, welding or the like, but may also be integrally formed with the column. The column may be provided with a lower frit 14 adjacent to the outlet port, on which frit the polymer 15 is placed. A further, upper, frit 16 may be placed as shown on the upper surface of the polymer nearer to the first end of the column, leaving a space suitable for loading a sample between the upper frit and the first end.

Particulate polymer formed from any of the aforementioned monomers and crosslinkers, or by any of the methods described herein, can be packed into a chromatographic or solid phase extraction column and used for chromatographic separation of a compound, e.g. a nitrosamine, from other components of a mixture, including molecules with similar structures or functionalities. The column may be packaged in a kit together with other equipment to facilitate the use thereof, including for example reagents for conditioning the column, reagents for eluting the column and re-generating the NIP, and one or more tools for handling the ingredients, such as a spatula, measuring cylinder and beaker, and instructions for the use of the equipment. The NIPs may be supplied in a suitable container, or in discrete quantities suitable of loading into the filtration column. The column itself may be supplied pre-loaded with the NIP.

Example 10

Forming Polymer Beads by Suspension Polymerization

The following series of experiments illustrates the effect on the physical properties of the polymer that may be attributable to changes in eight variable reaction conditions, or reaction parameters, for polymerization of the monomer and the crosslinker. Nineteen samples (Nos. E1-E19) of a polymer of EDMA and HEMA are prepared using Design of Experiments methodology to establish different combinations of values for the reaction conditions used in the preparation of each sample. The values for each experiment are selected in such a way as to enable an estimate to be made of the effect on polymerization of varying the reaction conditions independently of each other. The parameters chosen, and the ranges used are:

Molar ratio of cross-linker (XL): monomer (M) 4:1-6:1

Type of porogen: polar (ethyl acetate ("EtOAc")) or non-polar (Toluene)

Amount of porogen 0.7-1.5 wt %

Amount of initiator 1.5-3.3 wt % benzoyl peroxide

Polyvinyl alcohol type: low mol. wt/viscosity ("Celvol 203") or high mol. wt/viscosity ("Celvol 523")

PVOH concentration 1-3 wt % of aqueous phase

Solid content 10-20 wt %

Agitation (Stir rate) low (200 rpm)-high (300 rpm)

The values for the reaction conditions selected for each experiment are summarized in Table 4 below. In each experiment the crosslinker and monomer are polymerised using a suspension polymerization process. For each experiment, polyvinyl alcohol is dissolved in water by stirring at 50° C. for 3 hours to form an aqueous phase for the polymerization reaction. After cooling to room temperature, a monomer phase comprising the monomers, initiator and porogen is combined with the aqueous phase in a reaction vessel equipped with a stirrer to form a suspension. The suspension is stirred at for 30 minutes, and then heated to a temperature of 65° C. and maintained at that temperature for 18 hours with constant stirring to effect polymerization. After cooling, the resulting polymer is filtered from the mixture and washed with warm water, methanol and ethyl acetate.

The physical characteristics of the polymers produced in the experiments vary according to the particular reaction conditions, and are also described in Table 4 below.

The effect of the variations of reaction conditions on the quality of the polymer beads produced in each of the experiments is illustrated in Table 5 below. In Table 5, the results of the experiments are indicated in the squares carrying the relevant experiment number. The squares are shaded to indicate the quality of the beads produced. The darkest squares indicate experiments in which polymerization failed; the next the lighter shade, the formation of particles of irregular shape; the next lighter shade, the formation of clusters of spherical particles; the lightest shade, the formation of spherical beads together with fine particles. The unshaded square indicates the formation of well-defined spherical beads, without fine particles. In each of the following tables XL means EDMA; M means HEMA.

TABLE 4

Effect of reaction conditions on bead formation

| No | XL:M ratio | Porogen Type | Porogen Wt % | Initiator Wt % | PVOH type | PVOH Wt % | Solids Wt % | Stir rate (rpm) | Result |
|---|---|---|---|---|---|---|---|---|---|
| E1 | 4 | Toluene | 0.7 | 1.5 | C523 | 1 | 10 | 200 | Soft beads(incomplete polymerization) |
| E2 | 6 | Toluene | 0.7 | 1.5 | C523 | 3 | 20 | 300 | No polymerization |
| E3 | 4 | EtOAc | 0.7 | 1.5 | C203 | 1 | 20 | 300 | Irregular |
| E4 | 6 | EtOAc | 0.7 | 1.5 | C203 | 3 | 10 | 200 | Clusters |
| E5 | 4 | Toluene | 1.5 | 1.5 | C203 | 3 | 20 | 200 | Spherical, ~35 um + ~10 vol % |
| E6 | 6 | Toluene | 1.5 | 1.5 | C203 | 1 | 10 | 300 | No polymerization |
| E7 | 4 | EtOAc | 1.5 | 1.5 | C523 | 3 | 10 | 300 | Clusters |
| E8 | 6 | EtOAc | 1.5 | 1.5 | C523 | 1 | 20 | 200 | Clusters |
| E9 | 4 | Toluene | 0.7 | 3.3 | C203 | 3 | 10 | 300 | Clusters |
| E10 | 6 | Toluene | 0.7 | 3.3 | C203 | 1 | 20 | 200 | Clusters |
| E11 | 4 | EtOAc | 0.7 | 3.3 | C523 | 3 | 20 | 200 | Clusters |
| E12 | 6 | EtOAc | 0.7 | 3.3 | C523 | 1 | 10 | 300 | Clusters |
| E13 | 4 | Toluene | 1.5 | 3.3 | C523 | 1 | 20 | 300 | Spherical, ~60 um + ~5 vol % |
| E14 | 6 | Toluene | 1.5 | 3.3 | C523 | 3 | 10 | 200 | Spherical, 99 um |
| E15 | 4 | EtOAc | 1.5 | 3.3 | C203 | 1 | 10 | 200 | Clusters |
| E16 | 6 | EtOAc | 1.5 | 3.3 | C203 | 3 | 20 | 300 | Irregular |

TABLE 4-continued

Effect of reaction conditions on bead formation

| No | XL:M ratio | Porogen Type | Porogen Wt % | Initiator Wt % | PVOH type | PVOH Wt % | Solids Wt % | Stir rate (rpm) | Result |
|---|---|---|---|---|---|---|---|---|---|
| E17 | 5 | Toluene | 1.1 | 2.4 | C523 | 2 | 15 | 250 | Spherical, ~70 um + ~10 vol % |
| E18 | 5 | Toluene | 1.1 | 2.4 | C523 | 2 | 15 | 250 | Spherical, ~70 um + ~10 vol % |
| E19 | 5 | Toluene | 1.1 | 2.4 | C523 | 2 | 15 | 250 | Spherical, ~60 um + ~20 vol % |

TABLE 2

Analysis of Polymerization in experiments E1-E19

| PVOH Type | | C523 | | | C203 | |
|---|---|---|---|---|---|---|
| Solids Content wt. % | | 10 | 15 | 20 | 10 | 15 |
| Porogen: Toluene | 1.5 wt. % initiator | E1 Polym failure 1% PVOH Porogen 0.7 XL:M 4:1 200 rpm | | E2 Polym failure 3% PVOH Porogen 0.7 XL:M 6:1 300 rpm | E6 Polym failure 1% PVOH Porogen 1.5 XL:M 6:1 300 rpm | E5 Fines 3% PVOH Porogen 1.5 XL:M 4:1 200 rpm |
| | 2.4 wt. % initiator | | E17, 18, 19 Fines 2% PVOH Porogen 1.1 XL:M 5:1 250 rpm | | | |
| | 3.3 wt. % initiator | E14 Beads 3% PVOH Porogen 1.5 XL:M 6:1 200 rpm | | E13 Fines 1% PVOH Porogen 1.5 XL:M 4:1 300 rpm | E9 Clusters 3% PVOH Porogen 0.7 XL:M 4:1 300 rpm | E10 Clusters 1% PVOH Porogen 0.7 XL:M 6:1 200 rpm |
| Porogen: ETOAc | 1.5 wt. % initiator | E7 Clusters 3% PVOH Porogen 1.5 XL:M 4:1 300 rpm | | E8 Clusters 1% PVOH Porogen 1.5 XL:M 6:1 200 rpm | E4 Clusters 3% PVOH Porogen 0.7 XL:M 6:1 200 rpm | E3 Irregular 1% PVOH Porogen 0.7 XL:M 4:1 300 rpm |
| | 3.3 wt. % initiator | E12 Clusters 1% PVOH Porogen 0.7 XL:M 6:1 3200 rpm | | E11 Clusters 3% PVOH Porogen 0.7 XL:M 4:1 200 rpm | E15 Clusters 1% PVOH Porogen 1.57 XL:M 4:1 200 rpm | E16 irregular 3% PVOH Porogen 1.5 XL:M 6:1 300 rpm |

The foregoing experiments demonstrate that good quality polymer beads can be formed by suspension polymerization of the cross-linker and monomer in the presence of a stabiliser comprising an aqueous polyvinyl alcohol solution, preferably containing greater than 2 wt. % PVOH, probably up to 4 or 5 wt %, which should also preferably be of a high mol. wt./ viscosity grade, such as that supplied under the trade mark Celvol 523. The formation of well-defined beads of the NIPs is also favoured by the use of any one of more of the following (a) a relatively high amount of initiator, e.g. at least 3 wt. %; (b) a non-polar porogen, e.g. toluene and (c) a reaction mixture that has a relatively low solids content, e.g. about 10 wt. %. It is believed that by reason of the relatively high concentration of polyvinyl alcohol and possibly also by reason of the relatively high amounts of initiator that residues of the polyvinyl alcohol become incorporated into the porous beads in amounts effective to improve selectivity for nitroso-containing compounds relative to nicotine.

Example 11

Evaluation of Beads Formed by Suspension Polymerization

The performance of the NIPs produced in run No's E3-E5 and E7-E19 of Example 10 in the adsorption of nitroso compounds, and the selectivity of their adsorption relative to nicotine, is demonstrated by carrying out the following 2-stage extraction tests on each polymer. The poorly polymerised products of run Nos E1, E2 and E6 were not tested A test solution is prepared containing 4 μg/ml of nicotine ("NIC"), 80 ng/ml of NNN, 80 ng/ml NNK, 80 ng/ml NAT, and 40 ng/ml of NAB in an aqueous buffer solution of 15 mM phosphate at pH 6.3. For each test, 125 mg of each of the NIPs of Example 10 are first conditioned by stirring the sample of the NIP with 5 ml of ethanol at room temperature, removing the ethanol by filtering them mixture through a 10 μm frit, stirring the sample with 5 ml distilled water for 2 minutes at room temperature, and again filtering the mixture through a 10 μm frit. In Stage 1 of the test, each sample NIP is stirred with the test solution for 10 minutes at about 5° C. The solution is separated from the sample by filtering the mixture through a 10 μm frit, and the content of the solution is analysed using liquid chromatography with ultra-violet radiation detection ["LC-UV] in order to estimate the % of nicotine and TSNA's extracted from the test solution by the NIP. In Stage 2 of the test, the NIP recovered from the first stage is stirred with 5 ml distilled water at about 5° C. for 10 minutes and the water is removed therefrom by filtration through a 10 ml frit. The content of the solution is analysed using LC-UV in order to estimate the % of nicotine and TSNA's extracted from the test solution and still retained by the NIP after the washing stage.

The results for the individual NIPs are summarized in Table 6 below which tabulates for each NIP tested the wt. % of nicotine ("NIC"), NNN, NNK and NAT remaining in the test solution after (a) Stage 1 and (b) Stage 2 of the test. The average figures for all 19 experiments are shown in the last line to give an overall indication of the performance of the NIPs.

TABLE 6

| Run No | % remaining in solution after Stage 1 (Extraction only) | | | | % remaining in solution after Stage 2 (Extraction & Wash) | | | |
|---|---|---|---|---|---|---|---|---|
| | NIC | NNN | NNK | NAT | NIC | NNN | NNK | NAT |
| E3 | 89.1 | 45.6 | 27.0 | 21.7 | 95.3 | 61.1 | 37.5 | 30.0 |
| E4 | 90.2 | 32.2 | 13.2 | 9.2 | 96.3 | 51.9 | 23.0 | 15.7 |
| E5 | 88.0 | 26.3 | 8.8 | 5.9 | 97.5 | 44.4 | 16.0 | 10.8 |
| E7 | 83.8 | 26.7 | 9.4 | 6.5 | 91.9 | 45.9 | 17.9 | 12.8 |
| E8 | 87.3 | 25.4 | 9.8 | 6.8 | 94.9 | 43.6 | 17.5 | 12.8 |
| E9 | 88.4 | 29.4 | 11.1 | 6.8 | 96.0 | 50.5 | 21.2 | 13.1 |
| E10 | 87.3 | 27.0 | 11.7 | 5.7 | 101.0 | 45.1 | 19.2 | 10.1 |
| E11 | 85.7 | 46.0 | 29.7 | 20.8 | 94.9 | 59.4 | 38.5 | 27.4 |
| E12 | 84.5 | 27.4 | 10.2 | 7.8 | 95.1 | 43.5 | 16.8 | 12.4 |
| E13 | 88.9 | 27.5 | 9.5 | 7.8 | 100.4 | 43.4 | 16.8 | 13.0 |
| E14 | 86.7 | 24.2 | 8.0 | 5.1 | 102.4 | 41.0 | 15.3 | 9.4 |
| E15 | 81.7 | 29.5 | 12.3 | 7.5 | 91.9 | 48.1 | 20.6 | 13.2 |
| E16 | 79.6 | 25.6 | 10.4 | 6.1 | 88.2 | 43.3 | 17.4 | 11.4 |
| E17 | 90.4 | 25.2 | 8.2 | 4.8 | 100.7 | 42.9 | 16.2 | 9.5 |
| E18 | 87.5 | 26.4 | 8.7 | 5.5 | 99.0 | 44.8 | 16.9 | 10.7 |
| E19 | 86.8 | 28.2 | 10.3 | 6.1 | 95.2 | 47.4 | 20.0 | 11.7 |
| Average | 86.6 | 29.5 | 12.4 | 8.4 | 96.3 | 47.3 | 20.7 | 14.0 |

The recovery figures in excess of 100% in Table 6 are caused by variations in measurements within the limits of experimental error.

All the NIP's tested show good selectivity for TSNA's relative to nicotine in that at least 81.7% of the nicotine remained in solution after Stage 1, whereas the amount of NNN, NNK and NAT retained in solution were at most 46.0%, 29.7% and 21.7% respectively. The percent nicotine remaining in solution is seen to increase after Stage 2, indicating that nicotine is relatively weakly adsorbed by the NIP in the extraction step, and can be released in the washing step, resulting in 100% recovery in some cases.

Although the rates of extraction of TSNA's tested by the NIP's vary between the four TSNA's, the relative rates of extraction, obtained by plotting the rates of extraction by each NIP of NNK, NAT and NAT against the rate of extraction of NNN, exhibit very good correlation both after Stage 1 and Stage 2.

Figure 4A:
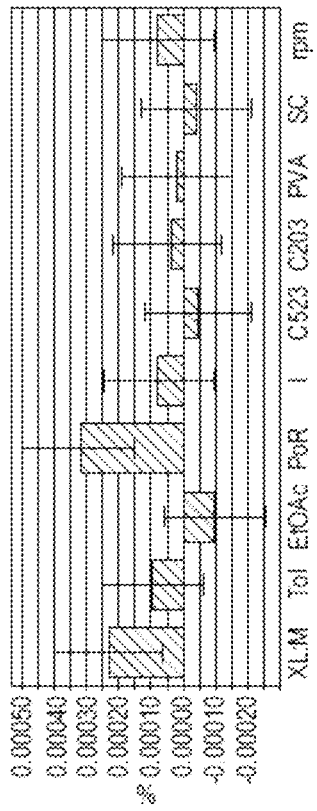
FIGS. 4a-4d illustrate graphically some of the data described in Example 11.
Figure 4B:
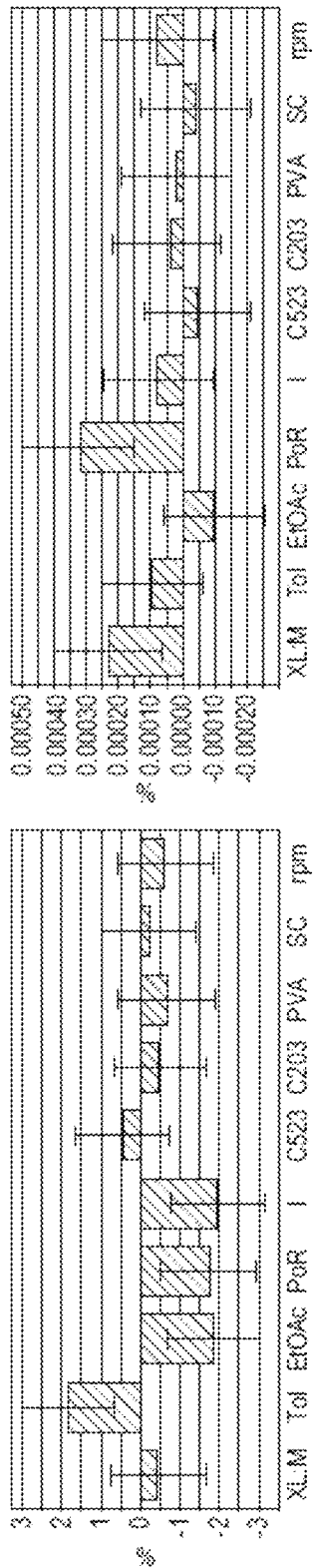
Figure 4C:
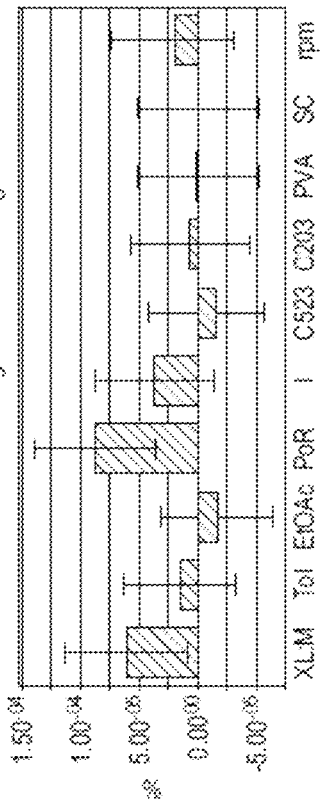
Figure 4D:
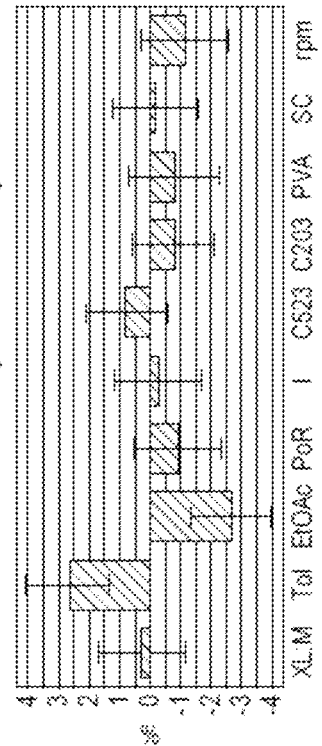

The experimental data can be analysed by computer using design of experiments software, such as that sold under the trade mark MODDE by Umetrics AB, to generate coefficients for each parameter examined representing the positive or negative influence that the parameter has on the performance of the NIP's. FIGS. 4*a* and 4*b* are charts plotting, respectively, coefficients for the reaction parameters with respect to the wt % of nicotine retained in the test solution and the wt % of NNN removed from the solution by the polymer after Stage 1 (extraction). FIGS. 4*c* and 4*d* are similar charts plotting the coefficients after Stage 2 (extraction and washing). The vertical bars on each chart plot the coefficients for the following reaction parameters from left to right.

Molar ratio EDMA (XL):HEMA (M)
Porogen type Polar ("EtOAc)") or non-polar ("Tol")
Porogen amount) PoR
Initiator amount "I"
PVOH type low MW ("C523)" or high MW ("(C203)")
PVOH amount "PVA"
Solids content "SC"
Stirring rate "rpm"

In FIGS. 4*a*-4*d*, positive values indicate desirable effects; negative values, undesirable effects Thus, for nicotine, the bars indicate, for each parameter, the average difference in percentage points between the amount of nicotine remaining in solution when using the high value of the parameter as compared with the amount remaining when using the medium level. A positive coefficient therefore indicates that more nicotine remains in solution when using the parameter at the high value, while negative values indicate lower nicotine levels remaining in solution. For NNN and the other TSNA's, the bars also indicate, for each parameter, the average difference between the amount of nicotine remaining in solution when using the high and medium values of the parameter. However in order to facilitate the comparison of the effect of the parameter on nicotine and NNN, the inverse square (NNN=NNN$^{-2}$) of the percentage point data is plotted in the charts, so that a positive coefficient indicates that less NNN remains in solution when using the parameter at the high value, and a negative coefficient indicates higher levels of TSNA remaining in solution when using the parameter at the high value, and therefore lower extraction rates by the NIPs.

Since the rates of adsorption of all the TSNA's tested correlate well with each other, the coefficients for NNN are representative of all four TSNA's that were tested.

Each plot on the charts has an error bar. Where the error bar crosses the zero line, the result is not considered to be statistically significant.

Considering the statistically significant plots, it can be seen that the use of a non-polar porogen ("Tol") is positive in that the amount of nicotine remaining in the test solution after each Stage is increased, whereas the use of a polar porogen is negative in that the amount of nicotine remaining at each Stage is decreased.

Although the effect on nicotine levels of increasing the amount of porogen ("POR") and Initiator ("I") is negative after Stage 1, the effect is no longer significant after Stage 2. However the effect on TSNA levels of increased levels of porogen is positive at both stages of the test, which indicates that nicotine is less strongly bound to the NIPs than TSNA's and if desired may be recovered from the NIP in a further treatment step, such as washing with water.

A higher XL:M (crosslinker:monomer) ratio, (e.g. di- or polyalkenyl monomer:monoalkenyl monomer) has a positive effect in that it increases the rate of adsorption of TSNA's at both Stages, particularly NNN.

Example 12

Effect of Reaction Conditions on Bead Size

The following series of experiments illustrates the effect on the particle size of polymer beads attributable to changes in four parameters for polymerization of the monomer and the crosslinker. Seventeen samples of polymer (nos. N1-N17) are prepared by suspension polymerization of EDMA and HEMA in the presence of toluene porogen, a high molecular weight polyvinyl alcohol (Celvol 523), at a temperature of 70° C. in a reaction mixture having a solids content of 10% by weight, which is stirred at a speed of 250 rpm. The values for the three chosen parameters in each experiment are established by Design of Experiment methodology so as to enable an estimate to be made using DoE software, such as that sold under the trade mark MODDE by Umetrics AB, of the effect on particle size and TSNA selectivity of varying each parameter both independently and together with other parameters. The parameters chosen for these experiments are Ratio of EDMA:HEMA (XL:M) 4:1-6:1
Amount of initiator 1.0-4.67 wt. %
Amount of PVOH 1.0-4.5 wt. % of aqueous phase
Amount of porogen 1.0-1.7 mL/g In a further series of experiments (A-C), the effect of different amounts of porogen is studied. The parameters chosen for these experiments are:

Ratio of crosslinker:monomer: 5:1
Amount of initiator 2.84 wt. %
Amount of PVOH 3.0 wt. % of aqueous phase
Amount of porogen 1.0-1.7 mL/g The individual reaction conditions for each experiment are summarized in Table 7 below. The average diameter of the particles of the beads of polymer produced in each experiment, and the estimated volume of fines produced are also given in Table 7.

TABLE 7

Effect of reaction conditions on bead size

| No. | Initiator (wt %) | Porogen (mL/g) | XL:M ratio (mol/mol) | PVOH (wt %) | Solids Content (wt %) | Av. Diam. (μm) | % Vol fines (est.) |
|---|---|---|---|---|---|---|---|
| N1 | 1.00 | 1.27 | 4 | 1.5 | 10 | 83 | 4 |
| N2 | 1.00 | 1.27 | 4 | 4.5 | 10 | 31 | 4 |
| N3 | 1.00 | 1.27 | 6 | 1.5 | 10 | 94 | 3 |
| N4 | 1.00 | 1.27 | 6 | 4.5 | 10 | 37 | 3 |
| N5 | 4.67 | 1.27 | 4 | 1.5 | 10 | 98 | 3 |
| N6 | 4.67 | 1.27 | 4 | 4.5 | 10 | 35 | 3 |
| N7 | 4.67 | 1.27 | 6 | 1.5 | 10 | 101 | 4 |
| N8 | 4.67 | 1.27 | 6 | 4.5 | 10 | 39 | 3 |
| N9 | 2.84 | 1.27 | 5 | 1.5 | 10 | 103 | 4 |
| N10 | 2.84 | 1.27 | 5 | 4.5 | 10 | 36 | 3 |
| N11 | 2.84 | 1.27 | 4 | 3 | 10 | 62 | 1 |
| N12 | 2.84 | 1.27 | 6 | 3 | 10 | 63 | 1 |
| N13 | 1.00 | 1.27 | 5 | 3 | 10 | 59 | 1 |
| N14 | 4.67 | 1.27 | 5 | 3 | 10 | 60 | 1 |
| N15 | 2.84 | 1.27 | 5 | 3 | 10 | 57 | 2 |
| N16 | 2.84 | 1.27 | 5 | 3 | 10 | 63 | 1 |
| N17 | 2.84 | 1.27 | 5 | 3 | 10 | 62 | 1 |
| A | 2.84 | 1.00 | 5 | 3 | 10 | 49 | 2 |
| B | 2.84 | 1.50 | 5 | 3 | 10 | 63 | 2 |
| C | 2.84 | 1.70 | 5 | 3 | 10 | 66 | 2 |

In all the experiments, spherical beads of the polymer are produced without agglomeration. In some cases fines are also produced, but in amounts of no more than 4% by weight. Smaller amounts of fines are produced where the reaction is carried out using PVOH in the middle of the 1.5 and 4.5 wt. % range, suggesting an optimum concentration of about 3 wt. %.

Figure 5:
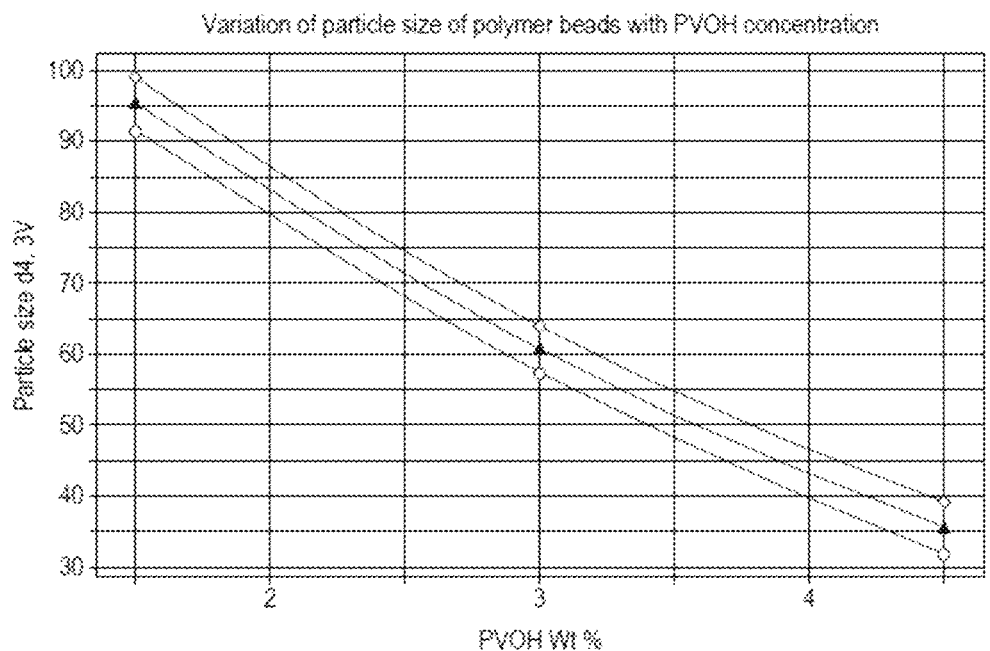
FIGS. 5 and 6 illustrate graphically some of the data described in Example 12.
Figure 6:
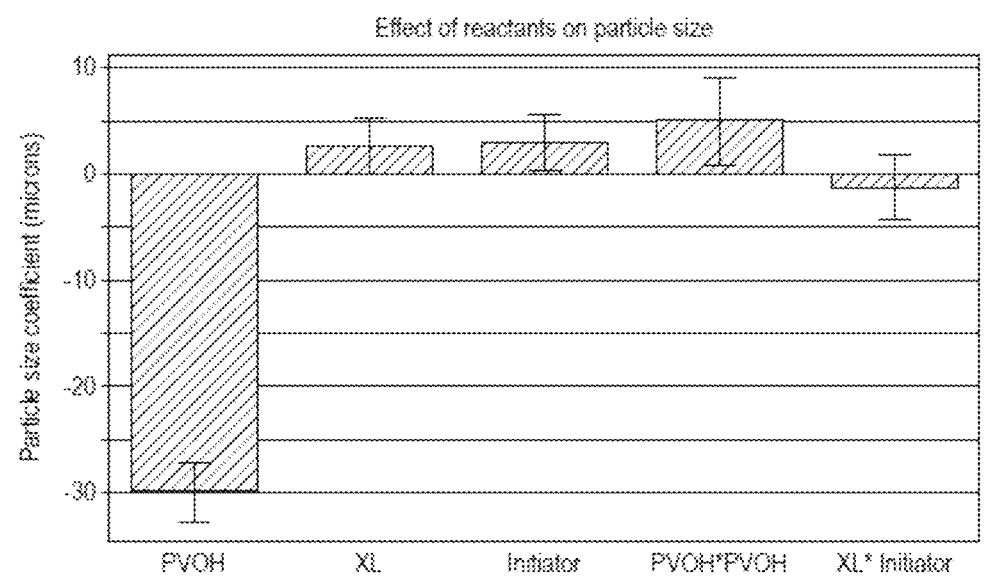

FIGS. 5 and 6 are derived from an analysis of the variation of the particle size of the polymer beads of experiments N1-N17 with the reaction parameters, using the DoE software referred to above. FIG. 5 illustrates the variation of particle size of the polymer beads produced in the experiments with PVOH concentration, expressed as the mean particle diameter by volume (d4,3V). FIG. 6 plots coefficients for the effects of the relative concentrations of PVOH, cross-linker (XL), initiator, the square of the PVOH concentration (shown as PVOH*PVOH in FIG. 6), and the combined interaction effect of using a high crosslinker:monomer ratio together with a high level of initiator. The analyses show that the particle size of the beads is affected most significantly by the concentration of PVOH in the reaction, higher concentrations tending to produce smaller particle sizes. The amount of initiator used also has a small effect upon particle size, higher concentrations tending to produce larger particle sizes.

In a further experiment, performed as described above using the following conditions:

Ratio of EDMA:HEMA (XL:M) 4:1
Amount of initiator 3.3 wt. %
Amount of PVOH 2.8 wt. % of aqueous phase
Amount of porogen 1.27 ml/g the product is in the form of beads having a bulk density in the dry state of 0.35 g/ml, a BET surface area of 308 $m^{2/g}$, a pore volume of 0.77 g/ml and an average pore diameter of 100 Å.

Example 13

Effect of Reaction Conditions on Selectivity

The performance of the NIPs prepared in Example 12 in the adsorption of nitroso compounds, and their selectivity of their adsorption relative to nicotine, is demonstrated by carrying out extraction tests on each compound according to the procedure described in Example 11.

Each sample of NIP was tested and the averages of the two sets of results are summarized in Table 8. The column headed "Av." shows the average extraction rates for all four TSNA's (NNN, NNK, NAT and NAB) in each experiment.

TABLE 8

Extraction of Nicotine and TSNA's

| | Wt % Extracted after Stage 1 (load only) | | | | | | Wt % Extracted after Stages 1 and 2 (load + wash) | | | | | |
|---|---|---|---|---|---|---|---|---|---|---|---|---|
| Ex. N | NIC | NNN | NNK | NAT | NAB | Av | NIC | NNN | NNK | NAT | NA | Av |
| N1 | 14.5 | 75.6 | 90.4 | 93.9 | 94.1 | 87.1 | 7.1 | 59.4 | 84.1 | 89.1 | 88.3 | 80.2 |
| N2 | 12.9 | 74.7 | 91.1 | 94.5 | 92.9 | 88.3 | 3.3 | 57.2 | 83.2 | 89.4 | 87.3 | 79.3 |
| N3 | 15.5 | 77.6 | 92.3 | 94.8 | 94.3 | 89.7 | 6.8 | 62.9 | 86.7 | 90.9 | 89.5 | 82.5 |
| N4 | 14.8 | 76.4 | 91.7 | 94.7 | 94.9 | 89.4 | 3.1 | 60.9 | 85.4 | 90.3 | 89.7 | 81.6 |
| N5 | 18.1 | 79.6 | 93.7 | 95.2 | 95.0 | 90.9 | 7.8 | 64.8 | 88.6 | 90.9 | 90.0 | 83.6 |
| N6 | 19.5 | 79.8 | 93.8 | 95.6 | 95.6 | 91.2 | 7.2 | 65.6 | 88.8 | 91.4 | 91.3 | 84.3 |
| N7 | 16.2 | 77.6 | 92.5 | 94.4 | 91.4 | 89.0 | 9.3 | 62.9 | 87.5 | 89.8 | 87.7 | 82.0 |
| N8 | 18.4 | 82.0 | 92.8 | 94.6 | 95.1 | 91.1 | 8.1 | 69.6 | 87.7 | 90.6 | 91.8 | 84.9 |
| N9 | 16.3 | 77.4 | 92.1 | 94.1 | 92.2 | 88.9 | 6.5 | 62.6 | 86.6 | 89.0 | 88.0 | 81.6 |
| N10 | 17.2 | 79.5 | 92.0 | 94.7 | 94.9 | 90.3 | 6.0 | 64.4 | 86.4 | 90.3 | 90.3 | 82.8 |
| N11 | 17.0 | 77.9 | 91.3 | 93.5 | 92.6 | 88.8 | 6.3 | 61.8 | 85.1 | 89.1 | 87.8 | 81.0 |
| N12 | 17.9 | 80.4 | 92.8 | 94.5 | 93.7 | 90.3 | 5.7 | 65.5 | 87.3 | 90.4 | 89.6 | 83.2 |
| N13 | 13.5 | 77.7 | 92.3 | 94.8 | 94.9 | 89.9 | 4.0 | 61.3 | 85.9 | 90.5 | 90.5 | 82.1 |
| N14 | 17.8 | 82.7 | 93.7 | 96.0 | 94.9 | 91.9 | 7.6 | 69.0 | 88.7 | 92.5 | 91.4 | 85.4 |

TABLE 8-continued

Extraction of Nicotine and TSNA's

| | Wt % Extracted after Stage 1 (load only) | | | | | | Wt % Extracted after Stages 1 and 2 (load + wash) | | | | | |
|---|---|---|---|---|---|---|---|---|---|---|---|---|
| Ex. N | NIC | NNN | NNK | NAT | NAB | Av | NIC | NNN | NNK | NAT | NA | Av |
| N15 | 17.5 | 80.9 | 93.0 | 95.1 | 95.3 | 91.1 | 8.8 | 66.9 | 87.3 | 91.2 | 91.4 | 84.2 |
| N16 | 13.6 | 75.6 | 91.6 | 93.7 | 93.1 | 88.5 | 6.6 | 60.1 | 85.2 | 89.1 | 87.9 | 80.6 |
| N17 | 16.6 | 77.7 | 93.0 | 94.8 | 94.6 | 90.0 | 7.5 | 62.3 | 87.2 | 90.4 | 90.2 | 82.5 |
| A | 16.1 | 80.1 | 92.1 | 94.8 | 94.3 | 90.3 | 8.2 | 64.6 | 85.4 | 90.6 | 90.1 | 82.7 |
| B | 17.8 | 78.0 | 91.1 | 94.2 | 93.6 | 89.2 | 8.1 | 63.3 | 85.0 | 90.0 | 89.8 | 82.0 |
| C | 16.8 | 79.3 | 92.1 | 95.3 | 94.1 | 90.2 | 7.5 | 64.3 | 86.5 | 91.2 | 90.1 | 83.0 |

Figure 7A:
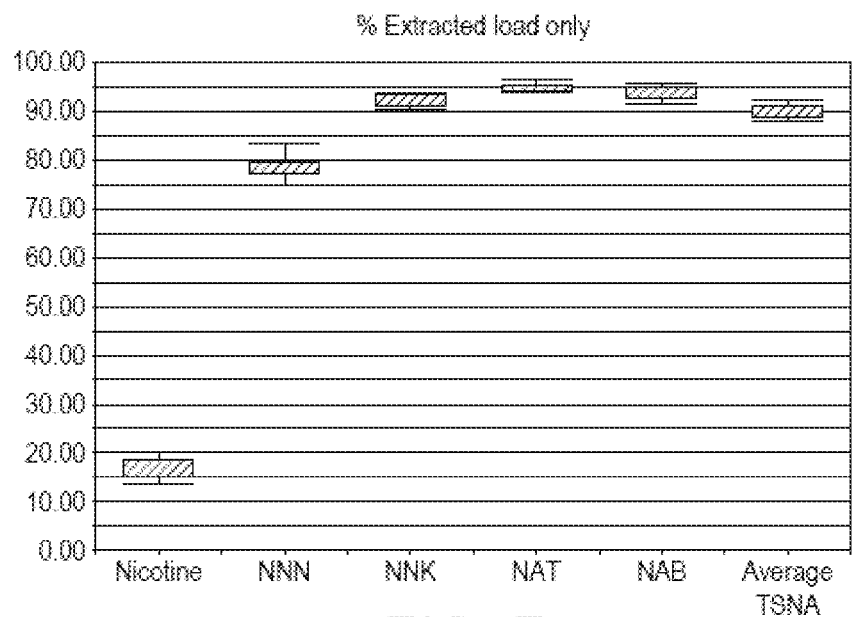
Figure 7B:
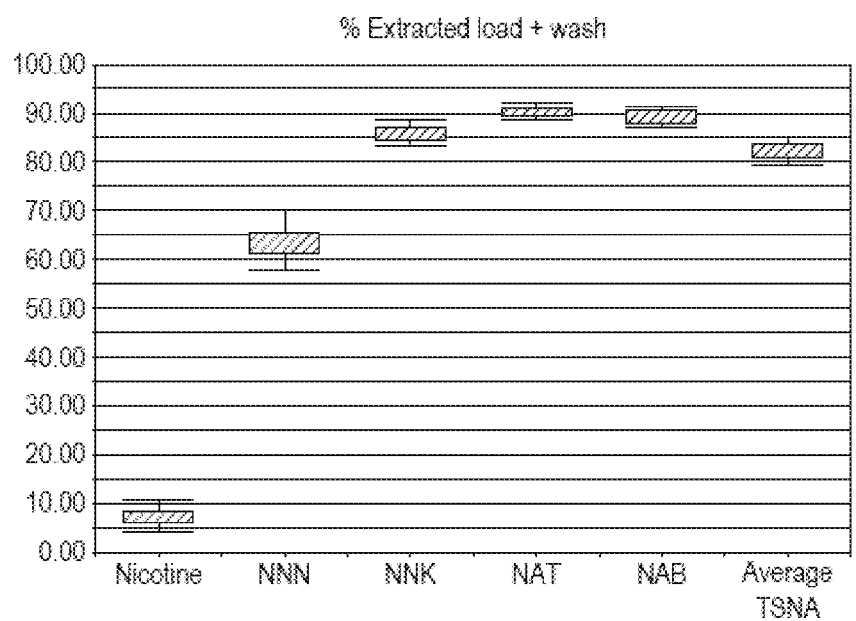

The results are summarized graphically in FIGS. 7a and 7b. FIG. 7a shows the results for Stage 1 (wt % extracted from the test solution after Stage 1 (loading only)). FIG. 7b shows the results for Stage 2 (wt % extracted from the test solution after Stages 1 and 2 (loading and washing)). From left to right in each of the charts, the horizontal bars mark the range of values obtained in the tests on all 20 NIPs for the weight % of nicotine (NIC) NNN, NNK, NAT and NAB respectively extracted from the test solution. The bar on the extreme right (Average TSNA) marks the range of values for the average rate of extraction of all four TSNA's by the 20 NIPS.

Figure 8A:
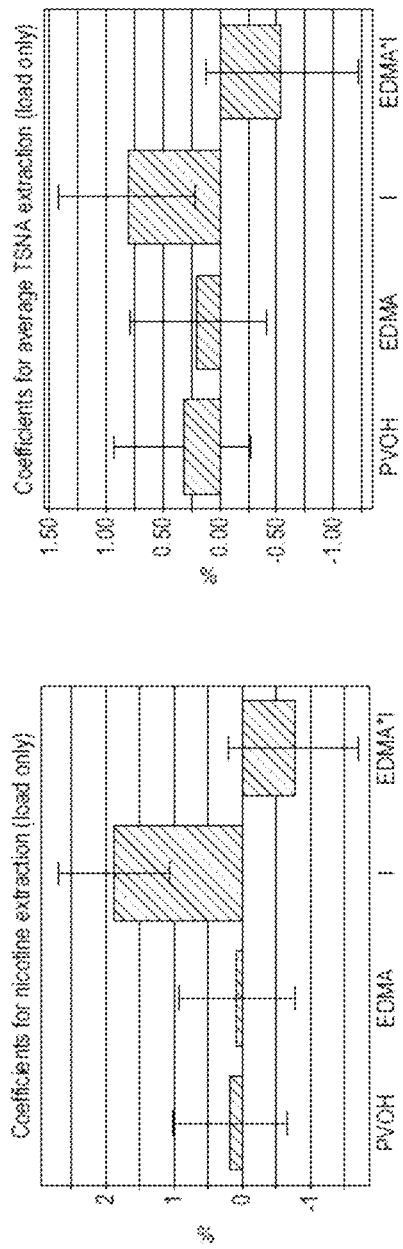
Figure 8B:
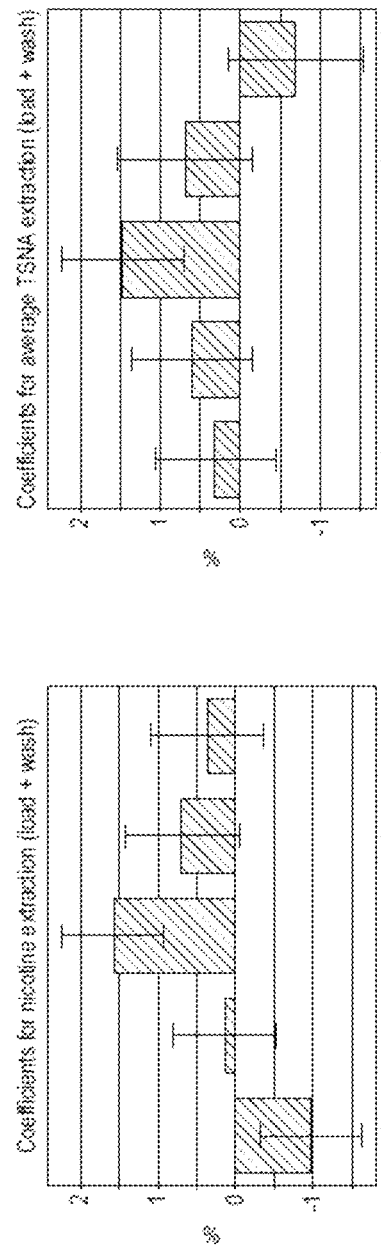

FIGS. 7a and 7b show that the NIPs are strongly selectively adsorbent, relative to nicotine, for all the TSNA's NAT being the most strongly adsorbed, NNN being the least strongly adsorbed. In each case, the wt % of nicotine and the TSNA's extracted was reduced by the washing step. Amongst the TSNA's the retention of NNN is the most strongly affected by washing. Nicotine is less strongly bound to the NIPs than any of the TSNA's and if desired may be recovered from the NIP in a further treatment step, such as washing with water The coefficients for the effect of each of the parameters on the extraction of nicotine and TSNA's for Stage 1 of the test procedure (load only) and Stage 2 (load and wash), calculated using the MODDE software, are shown in FIGS. 8a to 8d. FIGS. 8a and 8b relate to the extraction of nicotine and the average rates of extraction of the TSNA's respectively in Stage 1, FIGS. 8c and 8d to the respective rates of extraction in Stage 2.

It can be seen from FIGS. 8a and 8b that, in Stage 1 of the test, the amount of initiator used has a significant positive effect on the rates of extraction of both nicotine and the TSNA's.

Figure 8C:
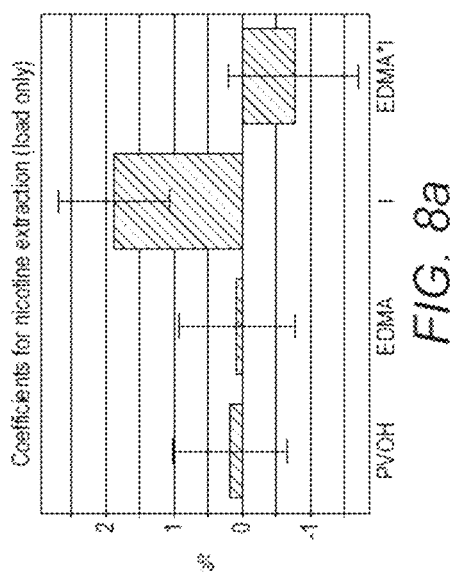
Figure 8D:
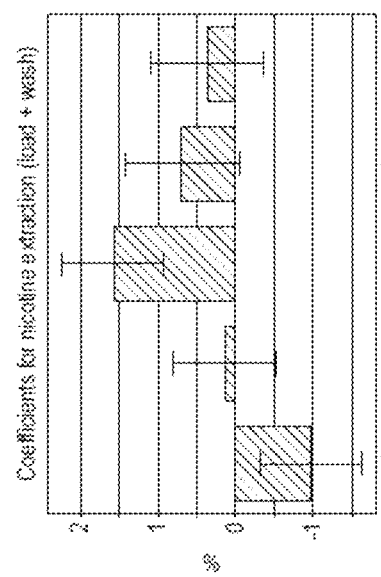

FIGS. 8c and 8d show that, for Stage 2, the rates of extraction of nicotine and the TSNA's increase as the amount of initiator increases, as in Stage 1, but that the amount of polyvinyl alcohol used also has a beneficial effect, in that the rate of extraction of nicotine decreases with increasing amounts of polyvinyl alcohol. In an extraction process involving washing after extraction therefore, the use of polyvinyl alcohol in the preparation of the NIP is beneficial in the selective extraction of TSNA's from a mixture of TSNA's and nicotine, in that the polyvinyl alcohol offsets the effect of the initiator on the level of adsorption of nicotine. As previously explained, it is believed that this is a result of incorporation of residues of polyvinyl alcohol into the crosslinked polymer.

FIG. 9 shows two response surface charts generated from the above data, FIG. 9a relating to nicotine extraction after Stage 2, FIG. 9b relating to the average rate of extraction of TSNA's after Stage 2. The PVOH content of the reaction mixture, shown on the x-axis, is plotted against the initiator content on the y-axis. The contour lines on the charts connect points at which the wt. % extracted are equal, the values for the amount extracted being shown in the labels on each line. The rectangular area designated in broken lines represents a region in which the amounts of initiator and PVOH are likely to provide a good balance between the extraction of TSNA's and nicotine. This extends from about 2.5 wt. % or more PVOH and 1.75 wt. % or more initiator. It therefore appears likely that the use of high levels of both PVOH and initiator may be beneficial in the production of polymers that are selective for TSNA's relative to nicotine. Extrapolating from FIG. 9, these levels may possibly be higher than the maximum levels of 4.5 wt. % used in these experiments However, the use of higher amounts of PVOH may increase the processing costs. Thus, PVOH is more difficult to dissolve at higher concentrations, more fines are likely to be generated on polymerization, the resulting increase in viscosity of the suspension creates difficulties in filtration, and more extensive washing would be required to remove the PVOH. The optimum amounts will therefore represent a compromise between these factors.

The effect of PVOH on elution rates of the nicotine and TSNA's in the test solution may depend upon the relative polarities of the TSNA's and nicotine. FIG. 10 shows in the same chart the coefficients for the extraction of nicotine and each individual TSNA's after Stage 2. The coefficients are plotted in order of the sequence in which they are eluted by reversed-phase liquid chromatography ("HPLC"), which in turn depends upon the polarity of the compound concerned. It can be seen that increased levels of PVOH decrease the extraction of the most polar compound (nicotine) and increases the extraction of the least polar compound. (NAB). The initiator increases the extraction of all the compounds, but the effect is stronger for the more polar compounds. The interaction effects of using a high di- or poly-alkenyl:monoalkenyl monomer ratio in combination with a high level of initiator (EDMA*I) decreases the extraction of the less polar compounds.

Experiments A-C reveal no significant difference in extraction rates compared with those of experiments N15-17, which indicates that varying the amount of porogen in the range 1.0-1.7 mL/g has no effect upon the TSNA selectivity of the NIPs with respect to nicotine.

The type of initiator used is unlikely to affect the performance of the NIPs. Initiators other than benzoyl peroxide may therefore be used in the polymerization reaction.

Example 14

Formation of Beads Using Various Monomers

The following series of 17 experiments (Nos. P1-P16 and P18) illustrate attempts to form polymers using monoalkenyl monomers ("monomers") and cross-linkers (in embodiments di- or polyalkenyl monomers) with different polarities, that is to say with monomers and crosslinkers that are more or less hydrophobic and hydrophilic, and also using acidic and basic monomers.

The monomers used were as follows, listed on an increasing scale of polarity. All the monomers are neutral with the exception of DEAEM, which is basic, and MAA, which is acidic.

Styrene (nonpolar, hydrophobic)
Methyl methacrylate (MMA) (some polar functionality, hydrophobic)
2-hydroxyethyl methacrylic acid (HEMA) (hydrophilic)
N-vinyl pyrrolidone (NVP) (polar functionality, hydrophilic)
2-Diethylamino ethyl methacrylate (DEAEM) (highly polar, hydrophilic, basic)
Methacrylic acid (MAA) (polar functionality, acidic)
The cross-linkers used were as follows, listed on an increasing scale of polarity:
Divinyl benzene (nonpolar, hydrophobic)
Trimethylolpropane trimethacrylate (TRIM)(some polar functionality, hydrophobic)
Ethylene glycol dimethacrylate (EDMA (some polar functionality, hydrophobic))
Diethylene glycol dimethacrylate (DEDMA)(highly polar, hydrophilic)

The seventeen samples of polymer are prepared by suspension polymerization. In each case, a monomer phase comprising monomer (M) and crosslinker (XL) in a molar ratio M:XL of 1:5, 2.84 wt % benxoyl peroxide initiator, and 1.27 ml/g toluene porogen, is mixed with an aqueous phase comprising 3 wt. % of high molecular weight polyvinyl alcohol (Celvol 523), at a temperature of 70° C. to form a suspension having a solids content of 10% by weight, which is stirred at a speed of 250 rpm for 18 hours to effect polymerization. After cooling, the resulting polymer is filtered from the mixture and washed with warm water, methanol and ethyl acetate.

The results of the polymerization and the quality of bead formation are summarized in Table 9. Each cell in the table that contains numerical data includes an Example No (P1-16 and P18), the volume average particle size in μm of beads, if formed, the approximate wt. % of fine particles forms ("Fines"), and the approximate wt. % of clusters, or aggregation, of polymeric material formed "Agg.".

TABLE 9

| | | Monomer (M) | | | | | |
|---|---|---|---|---|---|---|---|
| | | Non-acidic | | | | | Acidic |
| | | Polarity/hydrophilic nature increasing left to right | | | | | MAA |
| | | Styrene | MMA | HEMA | NVP | DEAEM | (Acidic) |
| Crosslinker (XL) (Polarity/ hydrophilic nature increasing top to bottom) | DVB | P1: 108 μm Fines 2% Agg: 1% | P2: 100 μm Fines 2% | P3: 60 μm Fines 1% | P4: 80 μm Fines: 2% | P5: No beads | P6: 70 μm |
| | TRIM | | | | P7: 76 μm Fines 2% | | |
| | EDMA | P8: 70 μm Fines 2% Agg: 10% | P9: 60 μm Fines 2% Agg: 45% | | P10: 50 μm Fines 2% Agg: 50% | P11: No beads | P12: 68 μm Fines 3% |
| | DEDMA (basic) | P13: 60 μm Agg: 50% | P14 60 μm Aggr: 70% | P15: 55 μm Fines 3% | P16: 50 μm Agg: 60% | | P18; 66 μm Fines 2% |

It can be seen from Table 9 that no beads of polymer are formed where a basic monomer, in this case DEAEM, is used. Aggregation, or the formation of clusters of polymer particles occurred in many cases together with the formation of beads. Well defined beads were obtained using neutral or acidic monomers.

Example 15

Performance of Beads Made Using Various Monomers

The performance of the NIPs prepared in Example 14 in the adsorption of nitroso compounds, and their selectivity of their adsorption relative to nicotine, is demonstrated by carrying out extraction tests according to the procedure described in Example 11. The results are summarized in Table 10. NIPs having poorly defined beads are not tested.

TABLE 10

| | Wt % Extracted after Stages 1 and 2 (load and wash) | | | | Wt % Extracted after Stage 1 (load only) | | | |
|---|---|---|---|---|---|---|---|---|
| Ex. N | NIC | NNN | NNK | NAT | NIC | NNN | NNK | NAT |
| P1 | 99 | 100 | 100 | 100 | 99 | 100 | 100 | 100 |
| P2 | 99 | 100 | 100 | 100 | 99 | 100 | 100 | 100 |
| P3 | 99 | 100 | 100 | 100 | 99 | 100 | 100 | 100 |
| P4 | 99 | 100 | 100 | 100 | 99 | 100 | 100 | 100 |
| P6 | 100 | 100 | 100 | 100 | 100 | 100 | 100 | 100 |
| P7 | 42 | 86 | 100 | 97 | 53 | 92 | 100 | 97 |
| P8 | 34 | 87 | 98 | 98 | 48 | 92 | 98 | 98 |
| P9 | 15 | 69 | 92 | 94 | 28 | 83 | 96 | 96 |
| P10 | 15 | 64 | 91 | 92 | 25 | 79 | 95 | 95 |
| P12 | 67 | 15 | 95 | 95 | 71 | 73 | 95 | 97 |
| P13 | 13 | 67 | 86 | 93 | 23 | 83 | 93 | 96 |
| P14 | 11 | 48 | 71 | 86 | 18 | 70 | 85 | 93 |
| P15 | 13 | 40 | 61 | 79 | 20 | 63 | 78 | 88 |
| P16 | 7 | 44 | 67 | 82 | 15 | 66 | 81 | 90 |
| P18 | 58 | 46 | 67 | 85 | 62 | 67 | 81 | 92 |

These results are further summarized in Table 11, which is in the same format as Table 9. For each experiment, the cell shows the wt. % nicotine and wt. % TSNA's extracted from the test solution after stage 2. Each cell is aligned horizontally with the appropriate monomer, shown in the top row from left to right in order of increasing polarity or hydrophilic nature, and vertically with the appropriate cross-linker, shown in the left hand column from top to bottom in order of increasing polarity or hydrophilic nature. The table also includes figures for the NIP derived from EDMA and HEMA, illustrated in previous examples. The NIPs exhibiting the highest selectivity for TSNA's relative to nicotine are those in the cells with the wider borders.

TABLE 11

| | | Monomer (M) | | | | |
|---|---|---|---|---|---|---|
| | | Non acidic Polarity hydrophilic nature increasing left to right | | | | Acidic |
| | | Styrene | MMA | HEMA | NVP | MAA |
| Cross-linker (XL) (Polarity/Hydrophilic nature increasing top to bottom) | DVB | P1 % NIC: 99 % TSNA: 100 | P2: % NIC 99 % TSNA: 100 | P3: % NIC 99 % TSNA: 100 | P4: % NIC 99 % TSNA: 100 | P6: % NIC 100 % TSNA: 100 |
| | TRIM | | | P7: % NIC 42 % TSNA: 86-100 | | |
| | EDMA | P8: % NIC 34 % TSNA: 87-98 | P9: % NIC 15 % TSNA: 69-94 | % NIC: 14-18 % TSNA 76-95 | P10: % NIC 15 % TSNA: 64-92 | P12: % NIC 67 % TSNA: 15-95 |
| | DEDMA | P13: % NIC 13 % TSNA: 67-93 | P14 % NIC 11 % TSNA: 48-86 | P15: % NIC 13 % TSNA: 40-79 | P16: % NIC 7 % TSNA: 44-79 | P18: % NIC 58 % TSNA: 46-85 |

It can be seen that use of an acidic monomer (MAA) adversely affects the selectivity of the NIPs for TSNA's relative to nicotine. Similarly the use of an entirely non-polar crosslinker (DVB) results in a polymer with poor selectivity towards TSNAs relative to nicotine. The polymers prepared from a non-acidic monomer and a crosslinker that is at least partially polar demonstrate better selectivity for TSNAs with respect to nicotine It can also be seen that the selectivity is improved by using monomers and cross-linkers with opposite polarities. Thus the NIP prepared from a hydrophobic monomer (styrene) and a hydrophilic cross-linker (DEDMA) exhibits good selectivity for TSNA's relative to nicotine. The NIPs prepared from a hydrophilic monomer (MMA, HEMA and NVP) and a hydrophobic crosslinker (EDMA) also exhibit good selectivity.

Example 16

Further Performance Evaluation

In order to evaluate the performance of NIPs in an environment that corresponds more closely to that of a tobacco treatment process, tests for TSNA selectivity are carried out using tobacco extract, a liquid produced by contacting cured tobacco leaves with water which contains nicotine and TSNA's together with many other compounds, which may potentially interfere with or mask the adsorptive effects of the NIPs.

The tests were carried out using the polymers described in Table 12

TABLE 12

| Example No | Ref | Polymer |
|---|---|---|
| R1 | TSNA MIP | A molecularly imprinted polymer (MIP) prepared by co-polymerising EDMA and HEMA using the process of Example 1, but carried out in the presence of a sulphonamide template, which is subsequently extracted from the polymer after the polymerization process |
| R2 | TSNA NIP | A NIP prepared by co-polymerising EDMA and HEMA with no template but otherwise under the same conditions used for Example R1. |
| R3 | DOE2-N1 | The NIP prepared from EDMA and HEMA, as in Example N1 |
| R4 | DOE2-N2 | The NIP prepared from EDMA and HEMA, as in Example N2 |
| R5 | DOE2-N5 | The NIP prepared from EDMA and HEMA, as in Example N5 |
| R6 | DOE2-N6 | The NIP prepared from EDMA and HEMA, as in Example N6 |
| R7 | DOE2-N11 | The NIP prepared from EDMA and HEMA, as in Example N11 |
| R8 | MMA:EDMA | The NIP prepared from EDMA and MMA, as in Example P9 |
| R9 | NVP:EDMA | The NIP prepared from EDMA and NVP, as in Example P10 |
| R10 | St:DEDMA | The NIP prepared from DEDMA and Styrene, as in Example P13 |

Each of the polymers are tested twice using the 2-stage procedure described in Example 11, save that the test solutions for each sample were prepared by adding 5 ml of a tobacco extract prepared by heating 12 g of tobacco with 240 ml water to 60° C. for 30 minutes, filtering and then cooling.

The average results of the two tests are shown in Table 13 below.

TABLE 13

| | % extraction - Stage 1 | | | | | | % extraction - Stage 2 | | | | | |
|---|---|---|---|---|---|---|---|---|---|---|---|---|
| No. | Nic | NNN | NNK | NAT | NAB | Av. TSNA | Nic | NNN | NNK | NAT | NAB | Av. TSNA |
| R1 | 12 | 71 | 88 | 85 | 83 | 82 | 2 | 44 | 82 | 78 | 76 | 70 |
| R2 | 10 | 70 | 88 | 87 | 84 | 82 | 0 | 40 | 79 | 79 | 76 | 69 |
| R3 | 11 | 67 | 84 | 85 | 83 | 80 | 3 | 34 | 74 | 76 | 73 | 64 |
| R4 | 8 | 67 | 84 | 87 | 84 | 80 | 1 | 32 | 73 | 77 | 74 | 64 |
| R5 | 11 | 69 | 85 | 85 | 82 | 80 | 6 | 38 | 76 | 76 | 73 | 66 |
| R6 | 10 | 72 | 88 | 88 | 85 | 83 | 5 | 39 | 79 | 80 | 76 | 68 |
| R7 | 8 | 66 | 84 | 85 | 82 | 79 | 3 | 34 | 74 | 76 | 72 | 64 |
| R8 | 12 | 75 | 90 | 88 | 85 | 85 | 5 | 48 | 84 | 82 | 79 | 73 |
| R9 | 10 | 72 | 89 | 87 | 85 | 83 | 5 | 40 | 81 | 80 | 77 | 70 |
| R10 | 4 | 71 | 83 | 88 | 85 | 82 | 0 | 41 | 73 | 81 | 78 | 68 |

It can be seen that the NIPs perform in a similar manner in relation to the tobacco extract samples as to the test solution used in the previous Examples. In general the level of extraction of nicotine by all the polymers is low even after Stage 1, the polymer based on Styrene and DEDMA (R10) extracting the least nicotine, even after Stage 1. The polymer based on MMA and EDMA (R8) extracts slightly more TSNA's than the others. The selectivity of the NIPs prepared by suspension polymerization is approximately equal to and in some cases exceeds that of the molecularly imprinted polymer (R1).

Example 17

Preparation of MIPs for Evaluation

Twelve different MIPS were prepared which represented all possible combinations of three templates (formamide, enamine, and sulfonamide), two monomers (acidic and neutral), and two cross-linkers (hydrophilic and hydrophobic). Using a 1:1 mixture of N-nitrosopiperidine and (−)-nicotine in water the MIPs were evaluated. Non-imprinted reference polymers were also generated and evaluated under like conditions. Results are summarized in FIG. 11. Examples of the preparation of enamine and pyridine carbinol templates as well as further description of methods which can be used for the purposes of the present invention can be found in WO 05/112670.

Figure 11:
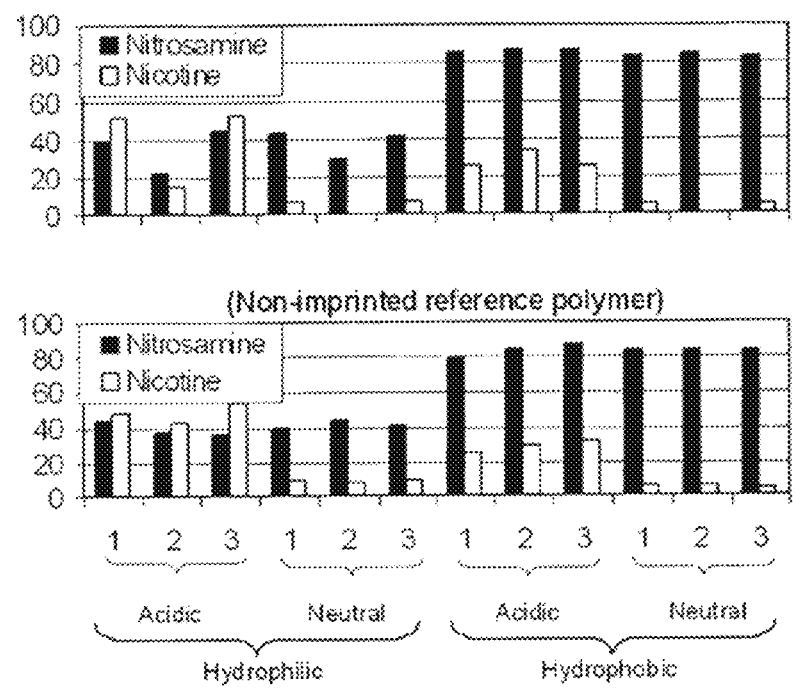
FIG. 11 shows results from extraction of N-nitrosopiperidine and nicotine where template 1 is formamide, template 2 is enamine and template 3 is sulfonamide.

As is evident from FIG. 11, MIPs using acidic monomers bind large amounts of nicotine. For applications where TSNAs are to be screened out while nicotine levels should remain unaffected, then, such a monomer is less favored. In addition, it is evident that MIPs with a hydrophobic cross-linker are better at binding nitrosamine than hydrophilic MIPs.

Example 18

Preparation of MIPs for Analytical Comparison

In view of the surprisingly positive performance of neutral, hydrophobic MIPs as summarized in FIG. 11, the neutral, hydrophobic MIPs imprinted with enamine or sulfonamide templates and polymerized using UV were selected for further analysis. For comparison, the best-performing hydrophilic MIP was also included in the sample. Seven MIPs were prepared using the parameters summarized in Table 1.

TABLE 1

| Name | Template | Monomer | Cross-Linker |
|---|---|---|---|
| MIP 1 | (1-vinyl piperidine / enamine of piperidine) | HEMA | EDMA |
| MIP 2 | (1-vinyl piperidine / enamine of piperidine) | HEMA | PETRA |
| MIP 3 | (piperidine sulfonamide, O=S=O) | HEMA | EDMA |
| MIP 4 | NNAL analogue | HEMA | EDMA |
| MIP 5 | NNAL analogue | HEMA | EDMA |
| MIP 6 | (pyridin-3-ylmethyl-N-methyl sulfonamide) | HEMA | EDMA |
| MIP 7 | (N-methyl-N-(pyridin-3-ylmethyl) enamine) | HEMA | EDMA |

Example 19

Evaluation of Selected MIPs with TSNA/Nicotine Mixtures

Figure 12:
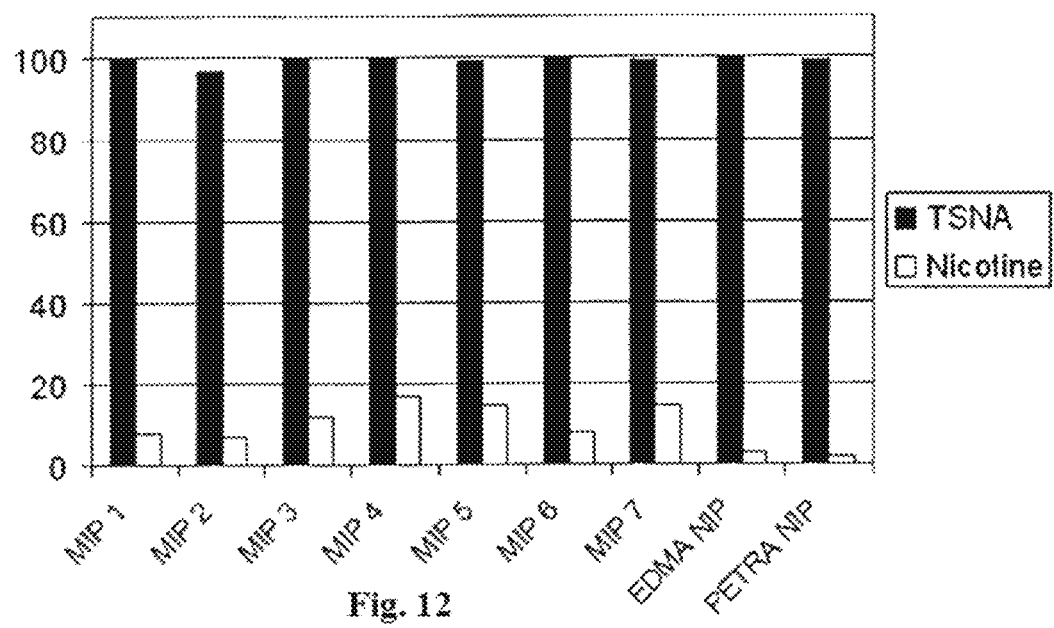
FIG. 12 shows percentage of TSNAs and nicotine extracted from aqueous solution.
Figure 13:
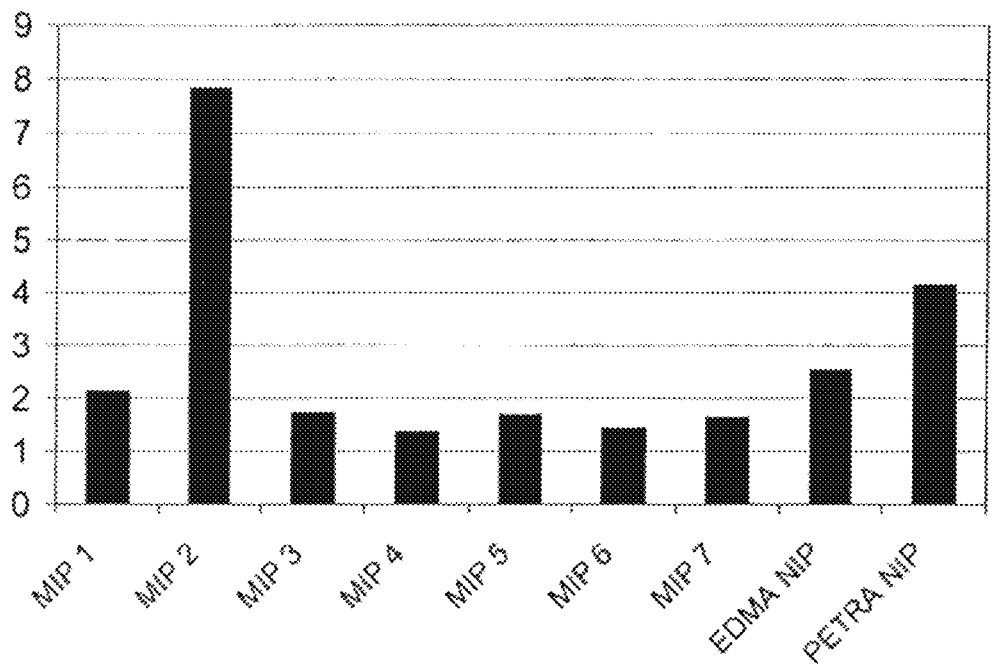
FIG. 13 shows percentage of TSNAs released upon a water wash.

SPE columns were prepared, each containing 25 mg of MIPs 1-7. To each column 1 ml of aqueous solution containing 0.30 pg/ml total TSNA and 0.2 g/ml nicotine was added. HPLC was used to determine the amount of TSNA that had not been extracted in each column, allowing for calculation of the extracted material, see FIG. 12. 1 ml of water was then passed through each column and the amount of TSNA released, if any, was determined see FIG. 12. Each of FIGS. 12 and 12 represent the average of two experiments.

Figure 14:
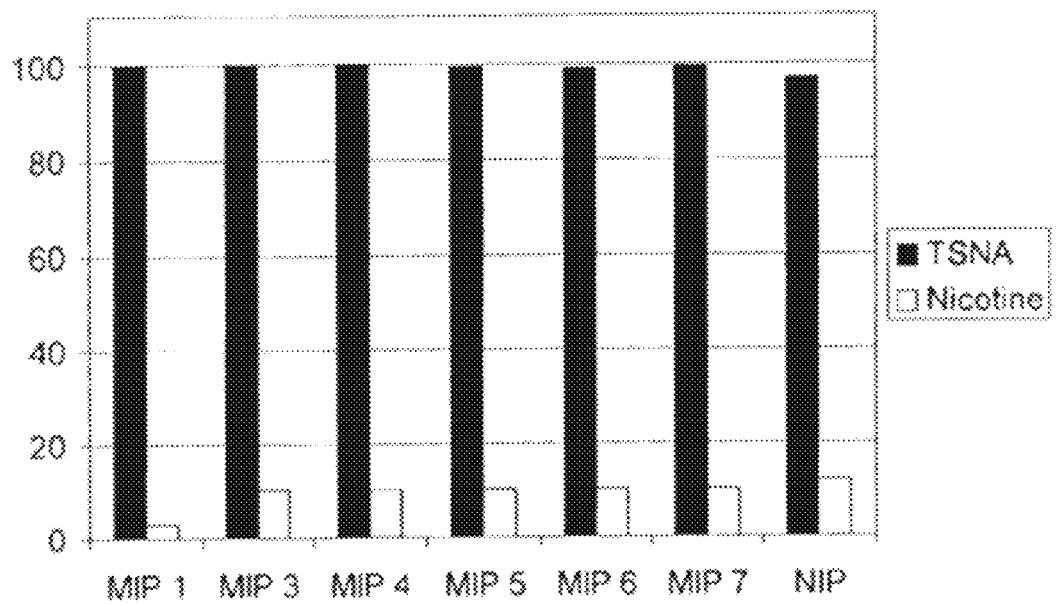
FIG. 14 shows percentage of TSNAs and nicotine extracted from aqueous solution.
Figure 15:
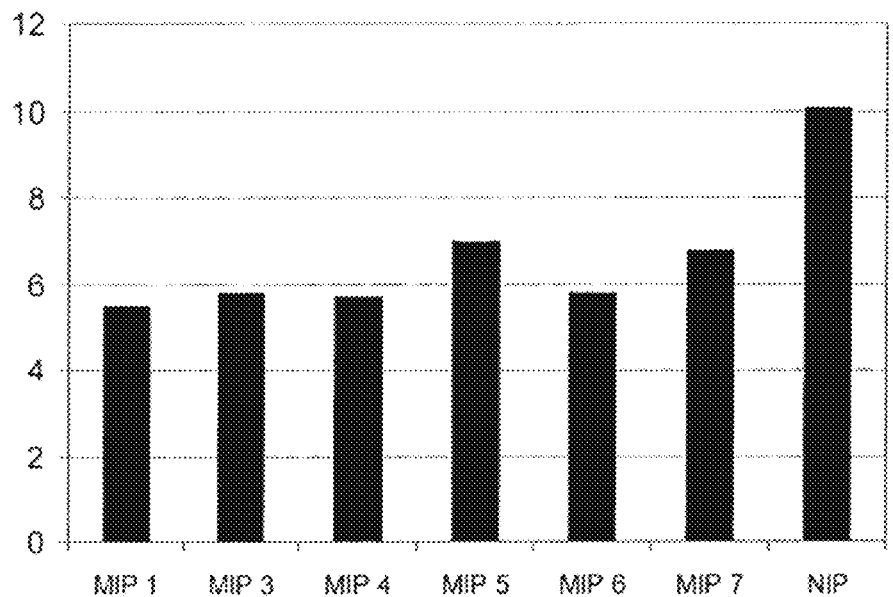
FIG. 15 shows percentage of TSNAs released upon a water wash.

Based on the strong performance of the hydrophobic, neutral MIPs, the evaluation for MIPs 1 and 3-7 was repeated using 1 ml of test solution containing 0.30 μg/ml total TSNA and 4 g/ml nicotine in pH 6.3 phosphate buffer (ionic strength 0.09). Results are shown in FIGS. 14 and 15, where both represent an average of two experiments. As can be seen, MIPs 1, 3, and 4 performed best by retaining 100% of the TSNA while allowing most of the nicotine to pass unencumbered.

The performance of MIPs 1, 3, and 4 was also evaluated at pH 5.3 and 7.3. As pH increased, retention of nicotine increased from approximately 10% to 30%, indicating that where nicotine is not to be affected, optimal performance is attained using slightly acidic pH. An acidic MIP formed using the acidic monomer MAA and the hydrophobic cross-linker EDMA was also evaluated using the same conditions at pH 6.3, it retained about 90% of the nicotine.

Regeneration of the MIPs was performed using a 0.5% TFA in MeOH wash. Other acid/alcohol mixtures may be used as well.

Example 20

Evaluation of Select MIPs with Specific TSNAs and Nicotine

Figure 16:
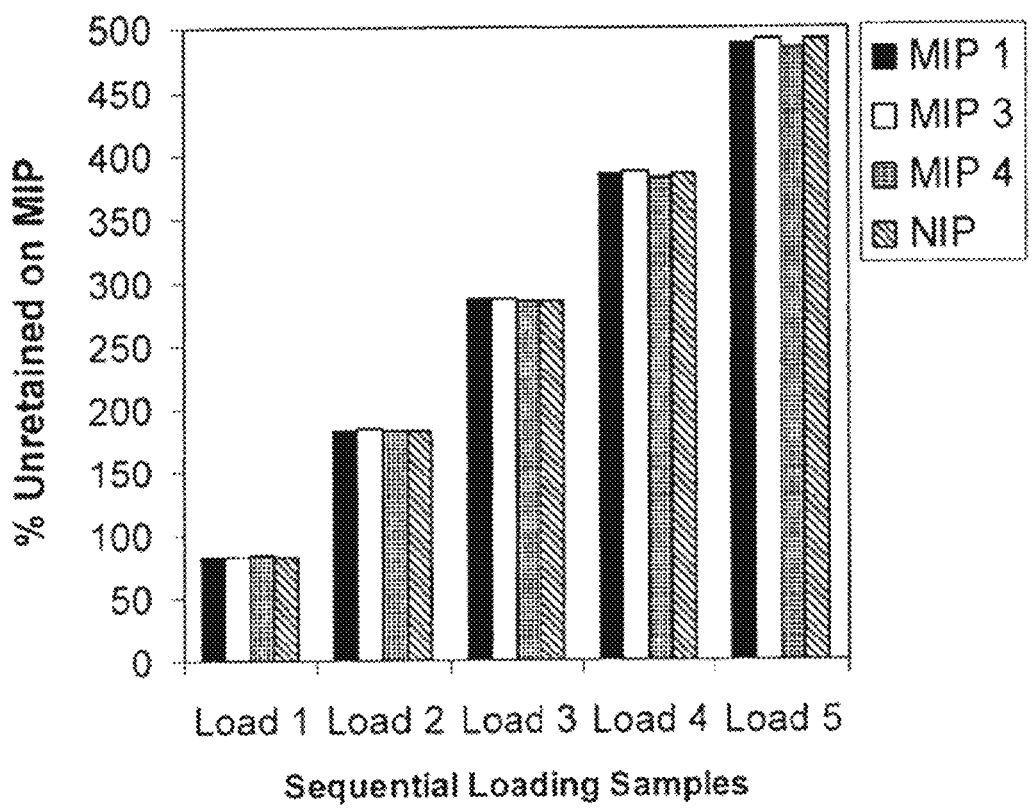
FIG. 16 shows the percentage of nicotine unretained after five separate sample loads.
Figure 17:
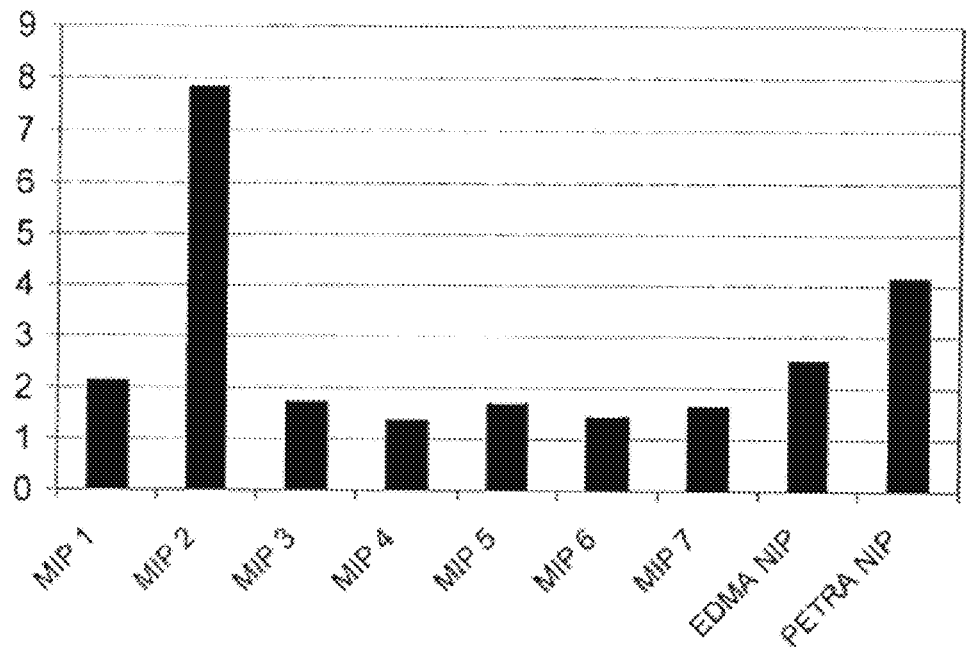
FIG. 17 shows the percentage of NNN unretained after five separate sample loads.
Figure 18:
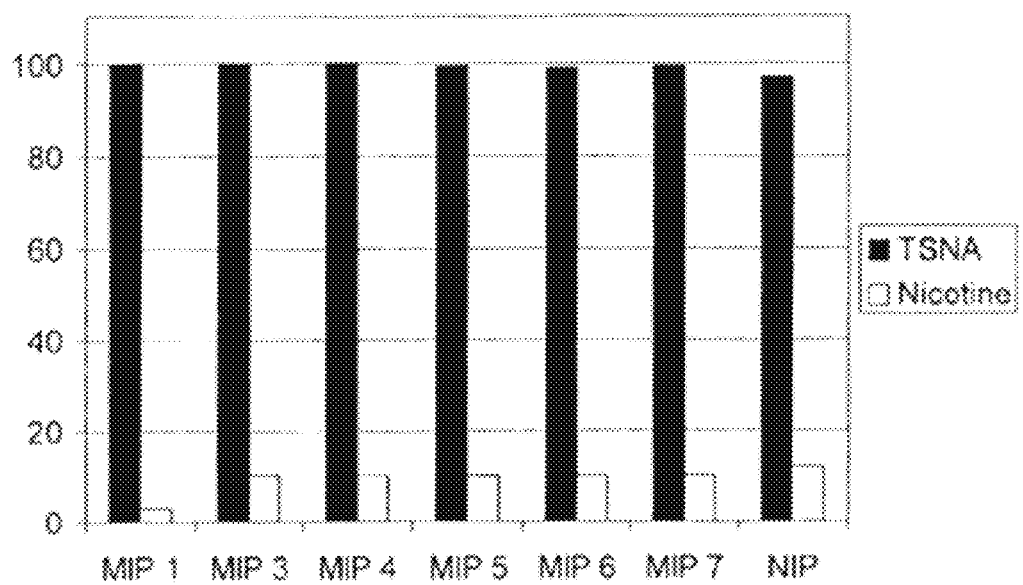
FIG. 18 shows the percentage of NNK unretained after five separate sample loads.
Figure 19:
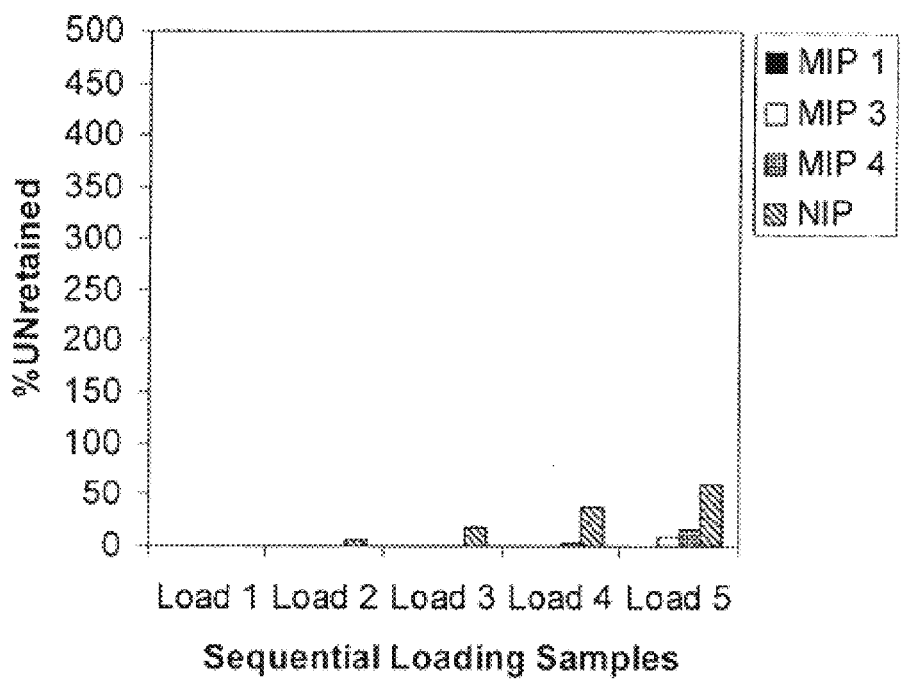
FIG. 19 shows the percentage of NAT unretained after five separate sample loads.
Figure 20:
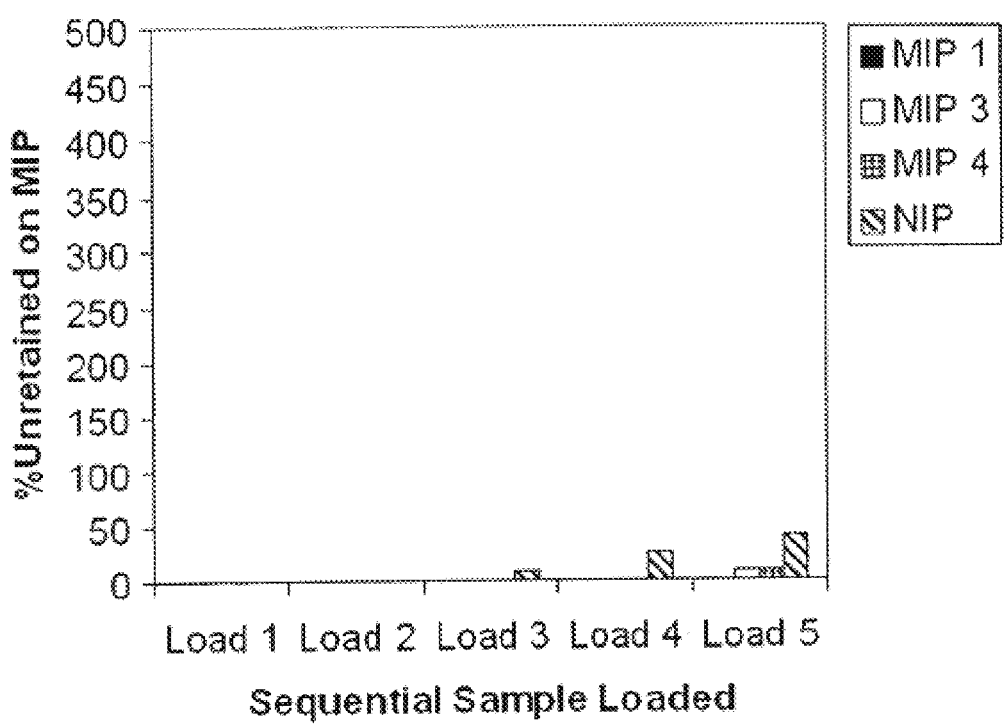
FIG. 20 shows the percentage of NAB unretained after five separate sample loads.

After finding the surprisingly positive performance of MIPs 1, 3, and 4 in the above-described experiments, a further evaluation was conducted. SPE columns were prepared with 25 mg of ground MIP and five loads of test solution at 1 ml each were loaded on the columns. The test solution was ca. 80 g/ml each of NNN, NNK, NAT, 40 μg/ml NAB and 4 pg/ml nicotine in pH 6.3 phosphate buffer (ionic strength 0.09). After loading each sample the amount of unretained nicotine and each TSNA was determined using HPLC. A control non-imprinted polymer was also evaluated. Results are shown in FIGS. 16-120. As seen in the figures, about 10% of the nicotine is bound by the MIPs in the first loading step. This saturates the MIP with nicotine and adding more sample on the column does not result in a further significant retention of nicotine. NNN is most weakly bound to the MIP and breakthrough is seen in the second loading step. Each of MIPs 1, 3, and 4 is excellent at retaining NNK, NAB, and NAT. Thus, the combination of neutral functional monomer, enamine or sulfonamide template, and hydrophobic cross-linker results in a surprisingly high retention of TSNA from a mixed sample while retaining only a minimal amount of nicotine.

Such MIPs are particularly attractive for applications where TSNAs are to be removed from a sample but nicotine should not be affected, such as treatment of tobacco or tobacco smoke to remove TSNAs. In addition, such MIPs can be utilized in an analytical capacity to measure the amount of TSNA is a sample of a product or a sample from a patient. In such cases, if nicotine is a component of interest the amount of nicotine retained by the MIP can be quantified and other methods, for example, nicotine-specific MIPs can be used to quantify the remaining amount of nicotine in the sample. The further step of evaluating nicotine levels could be done prior or subsequent to use of the TSNA specific MIPs of the present invention.

The foregoing Examples and drawings merely illustrate specific embodiments and are not intended to be limiting. Since modifications of the disclosed embodiments incorporating the spirit and substance of the invention encompassed by this specification may occur to persons skilled in the art, the invention should be construed to include everything within the scope of the appended claims and equivalents thereof.

The invention claimed is:

1. Beads for selectively removing a nitroso-containing compound from material containing the compound and nicotine, said beads comprising an adsorbent polymer of a non-acidic monomer and a cross-linker having polar functionality, one of which is hydrophilic, the other of which is hydrophobic, said beads having selectivity for said nitroso-containing compound over nicotine.

2. The beads of claim 1, wherein the beads are of average diameter 10-1000 μm, comprise <10 vol. % fines of diameter <10 µm, have a pore volume of 0.2-1.5 ml/g, have a B.E.T. surface area of 20-500 m²/g and have an average pore diameter of 30-300 Å.

3. The beads of claim 1, wherein the beads are of average diameter 10-100 µm, comprise <10 vol. % fines of diameter <10 µm, have a pore volume of 0.5-1.5 ml/g, have a B.E.T. surface area of 50-500 m²/g and have an average pore diameter of 50-200 Å.

4. The beads of claim 1, wherein moieties of the cross-linker in the polymer are in molar excess of moieties of the monomer.

5. The beads of claim 4, wherein the molar ratio of the moieties of the cross-linker and monomer is from 3:1 to 10:1.

6. The beads of claim 4, wherein the molar ratio of the moieties of the cross-linker and monomer is from 4:1 to 6:1.

7. The beads of claim 1, wherein the non-acidic monomer is selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, methacrylamide, N-methyl acrylamide, diethylamino ethylmethacrylate (DEAEM) and mixtures thereof, and the cross-linker is hydrophobic.

8. The beads of claim 7, wherein the cross-linker is selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof.

9. The beads of claim 1, wherein the non-acidic monomer is selected from styrene, methyl styrene, ethyl styrene, vinyl toluene, 2-vinyl pyridine, 2-ethylhexyl acrylate (EHA), butyl methyl acrylate (BMA), methyl methacrylate and mixtures thereof and the cross-linker is hydrophilic.

10. The beads of claim 9, wherein the cross-linker is selected from di(ethylene glycol)dimethacrylate ("DEDMA"), pentaerythritol tetraacrylate, tri(ethylene glycol)dimethacrylate, tetra(ethylene glycol)dimethacrylate, poly(ethylene glycol)dimethacrylate and pentaerythritol triacrylate (PETRA) and mixtures thereof.

11. The beads of claim 1, wherein the polymer is a copolymer of 2-hydroxyethylmethacrylate (HEMA) and a hydrophobic crosslinker.

12. The beads of claim 11, wherein the polymer is a copolymer of 2-hydroxyethylmethacrylate (HEMA) and ethylene glycol dimethacrylate (EDMA).

13. The beads of claim 1, wherein the polymer is a copolymer of 2- or 3-hydroxypropylmethacrylate (HEMA) and a hydrophobic crosslinker.

14. The beads of claim 13, wherein the polymer is a copolymer of 2 or 3-hydroxypropylmethacrylate (HEMA) and ethylene glycol dimethacrylate (EDMA).

15. The beads of claim 1, wherein the beads are molecularly imprinted for removal of nitroso compounds from material containing such compounds.

16. The beads of claim 1, wherein the beads are not molecularly imprinted but can selectively remove nitroso-containing compounds from material containing such compounds.

17. The beads of claim 1, wherein the beads are selective for removal of at least one of the compounds listed below from material containing said at least one compound and nicotine:
4-(methylnitrosamino)-1-(3-pyridyl)-1-butanone ("NNK");
4-(methylnitrosamino)-4-(3-pyridyl)butanal ("NNA");
N-nitrosonornicotine ("NNN");
N-nitrosoanabasine ("NAB");
N-nitrosoanatabine ("NAT");
4-(methylnitrosamino)-1-(3-pyridyl)-1-butanol ("NNAL");
4-(methylnitrosamino)-4-(3-pyridyl)-1-butanol ("iso-NNAL");
4-(methylnitrosamino)-4-(3-pyridyl)butanoic acid ("iso-NNAC").

18. The beads of claim 1, wherein the beads are porous.

19. The method of claim 18, wherein the amount of polyvinyl alcohol is 2.5-4.5 wt % based on the weight of monomers.

20. A method of making beads for selectively removing a nitroso-containing compound from material containing the compound and nicotine, said beads being of a non-acidic monomer and a cross-linker having polar functionality, one of which is hydrophilic, the other of which is hydrophobic, the method comprising suspension polymerizing a monomer phase comprising initiator, the non-acidic monomer and the cross-linker having polar functionality in an aqueous phase, said beads having selectivity for said nitroso-containing compound over nicotine.

21. The method of claim 20, wherein the polymerizing is conducted in the presence of toluene or other non-polar porogen.

22. The method of claim 21, wherein the amount of amount of initiator is 1.75-10 wt % based on the weight of the monomers.

23. The method of claim 22, wherein the polymer is the result of polymerization with 2.5-5 wt % initiator based on the weight of monomers.

24. The method of claim 20, wherein the monomer phase further comprises a structural analogue of a TSNA, and further comprising the step of removing the structural analog from the porous beads to give molecularly imprinted beads.

25. The method of claim 20, wherein the aqueous phase comprises polyvinyl alcohol in an amount such that polyvinyl alcohol residues become present in the beads.

26. A method for selectively removing a nitroso-containing compound from material containing the compound and nicotine, said method comprising contacting the material with an aqueous phase comprising beads of a selectively adsorbent polymer of a non-acidic monomer and a cross-linker having polar functionality, one of which is hydrophilic, the other of which is hydrophobic, said beads having selectivity for said nitroso-containing compound over nicotine.

27. The method of claim 26, wherein any of the following apply:
(a) the aqueous phase comprises polyvinyl alcohol in an amount such that polyvinyl alcohol residues become present in the beads;
(b) the beads are molecularly imprinted for removal of nitroso-containing compounds from material containing them;
(c) the beads can remove nitroso-containing compounds from material containing them but are not molecularly imprinted;
(d) the non-acidic monomer is selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, N-methyl acrylamide and mixtures thereof, and the cross-linker is hydrophobic;
(e) the cross-linker is selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof;

(f) the non-acidic monomer is selected from styrene, methyl styrene, ethyl styrene, 2-vinyl pyridine, vinyl toluene, ethylhexyl acrylate (EHA), butyl methyl acrylate (BMA), methyl methacrylate and mixtures thereof and the cross-linker is hydrophilic;

(g) the cross-linker is selected from N,N'-methylenebisacrylamide, di(ethylene glycol)dimethacrylate ("DEDMA"), pentaerythritol tetraacrylate, tri(ethylene glycol)dimethacrylate, tetra(ethylene glycol) dimethacrylate, poly(ethylene glycol)dimethacrylate and pentaerythritol triacrylate (PETRA) and mixtures thereof;

(h) the polymer is a copolymer of 2-hydroxyethylmethacrylate (HEMA) and a hydrophobic crosslinker;

(i) the polymer is a copolymer of 2-hydroxyethylmethacrylate (HEMA) and ethylene glycol dimethacrylate (EDMA);

(j) the polymer is a copolymer of 2- or 3-hydroxypropylmethacrylate (HEMA) and a hydrophobic crosslinker;

(k) the polymer is a copolymer of 2 or 3-hydroxypropylmethacrylate (HEMA) and ethylene glycol dimethacrylate (EDMA);

(l) the moieties of the cross-linker in the polymer are in molar excess of the moieties of the monomer;

(m) the moieties of the cross-linker and monomer are present in the polymer in a molar ration of from 3:1 to 10:1; or (n) the molar ratio of moieties of the cross-linker and non-acidic monomer in the polymer is from 4:1 to 6:1.

28. The method of claim 26, wherein the material is tobacco a tobacco material or a tobacco product.

29. The method of claim 28, wherein:
the tobacco material is treated with an extraction fluid to form an extract;
the extract is treated with the polymer; and
material remaining in the extract is recombined with the tobacco material; and
the polymer is washed after treatment of the extract, and nicotine is recovered from the washings and nicotine in the washings is recombined with the treated fluid.

30. The method of claim 29, wherein the polymer is washed after treatment of the extract, and nicotine is recovered from the washings and nicotine in the washings is recombined with the treated fluid.

31. The method of claim 26, wherein any of the following apply:
(a) producing tobacco leaf, treating the leaf with the polymer in order to reduce the TSNA content of the leaf, producing a consumable tobacco product therefrom and supplying the tobacco product to a consumer so as to deliver the nicotine;
(b) an analysis, detection, quantification, separation, extraction, chromatography, sample preparation, chemical sensors, or solid phase extraction;
(c) any of an analysis, detection, quantification, separation, extraction, chromatography, sample preparation, chemical sensors, or solid phase extraction when performed on biological fluid;
(d) wherein the tobacco product is produced by the thermal decomposition of a material containing tobacco, a tobacco substitute or a mixture thereof;
(e) the material is produced by the thermal decomposition of a material containing tobacco, a tobacco substitute or a mixture thereof by heating the material to a temperature below its combustion temperature;
(f) the material is produced by the thermal decomposition of a material containing tobacco, a tobacco substitute or a mixture thereof by combustion of the material.

32. A tobacco product, smoking article or smoke filter comprising tobacco and porous beads for selectively removing a nitroso-containing compound from material containing the compound and nicotine, said beads being of a selectively adsorbent polymer of a non-acidic monomer and a cross-linker having polar functionality, one of which is hydrophilic, the other of which is hydrophobic, said beads having selectivity for said nitroso-containing compound over nicotine.

33. A kit comprising beads for selectively removing a nitroso-containing compound from material containing the compound and nicotine, said beads comprising a polymer of a non-acidic monomer and cross-linker having polar functionality, one of which is hydrophilic, the other of which is hydrophobic, and being selective relative to nicotine for at least one nitroso-containing compound, and further comprising one or more of the following items:
(a) instructions for using the beads to perform at least one of analysing, detecting, quantifying, separating, extracting, reducing or removing nitroso-containing compounds in or from a sample;
(b) a column for solid phase extraction ("SPE"), chromatography or other filtration techniques;
(c) a quantity of any of the foregoing beads divided into discrete quantities suitable for loading into the filtration column;
(d) an SPE, chromatography or other filtration column packed with a quantity of any of the foregoing beads;
(e) reagents for conditioning the column;
(f) reagents for eluting the column and re-generating the beads; and
(g) one or more of a spatula, measuring cylinder, beaker or other tool for handling the ingredients.

34. The kit of claim 33, wherein any of the following apply:
(a) the beads contain residues of polyvinyl alcohol;
(b) the beads are molecularly imprinted for removal of nitroso-containing compounds from material containing them;
(c) the beads can remove nitroso-containing compounds from material containing them but are not molecularly imprinted;
(d) the non-acidic monomer is selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, N-methyl acrylamide and mixtures thereof, and the cross-linker is hydrophobic;
(e) the cross-linker is selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof;
(f) the non-acidic monomer is selected from styrene, methyl styrene, ethyl styrene, 2-vinyl pyridine, vinyl toluene, ethylhexyl acrylate (EHA), butyl methyl acrylate (BMA), methyl methacrylate and mixtures thereof and the cross-linker is hydrophilic;
(g) the cross-linker is selected from N,N'-methylenebisacrylamide, di(ethylene glycol)dimethacrylate ("DEDMA"), pentaerythritol tetraacrylate, tri(ethylene glycol)dimethacrylate, tetra(ethylene glycol) dimethacrylate, poly(ethylene glycol)dimethacrylate and pentaerythritol triacrylate (PETRA) and mixtures thereof;
(h) the polymer is a copolymer of 2-hydroxyethylmethacrylate (HEMA) and a hydrophobic crosslinker;
(i) the polymer is a copolymer of 2-hydroxyethylmethacrylate (HEMA) and ethylene glycol dimethacrylate (EDMA);
(j) the polymer is a copolymer of 2- or 3-hydroxypropylmethacrylate (HEMA) and a hydrophobic crosslinker;
(k) the polymer is a copolymer of 2 or 3-hydroxypropylmethacrylate (HEMA) and ethylene glycol dimethacrylate (EDMA);
(l) the moieties of the cross-linker in the polymer are in molar excess of the moieties of the monomer;
(m) the moieties of the cross-linker and monomer are present in the polymer in a molar ration of from 3:1 to 10:1; or
(n) the molar ratio of moieties of the cross-linker and non-acidic monomer in the polymer is from 4:1 to 6:1.

* * * * *